United States Patent
Kim et al.

(10) Patent No.: US 12,082,016 B2
(45) Date of Patent: Sep. 3, 2024

(54) METHOD AND APPARATUS FOR TRANSMITTING AND RECEIVING PDCCH IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 17/556,244

(22) Filed: Dec. 20, 2021

(65) Prior Publication Data

US 2022/0264339 A1    Aug. 18, 2022

Related U.S. Application Data

(60) Provisional application No. 63/173,473, filed on Apr. 11, 2021, provisional application No. 63/128,169, filed on Dec. 20, 2020.

(30) Foreign Application Priority Data

Jan. 15, 2021  (KR) .................. 10-2021-0005885
Jan. 21, 2021  (KR) .................. 10-2021-0008959

(51) Int. Cl.
*H04W 24/08*    (2009.01)
*H04W 72/044*   (2023.01)
(Continued)

(52) U.S. Cl.
CPC ....... *H04W 24/08* (2013.01); *H04W 72/0446* (2013.01); *H04W 72/0453* (2013.01); *H04W 72/046* (2013.01); *H04W 72/23* (2023.01)

(58) Field of Classification Search
CPC ........... H04W 72/046; H04W 72/0453; H04W 72/0446; H04W 72/23; H04W 24/08
(Continued)

(56) References Cited

U.S. PATENT DOCUMENTS 11,647,525 B2 *  5/2023  Kim .................. H04L 1/08
                                              370/329
2020/0045696 A1 *  2/2020  Huang ................ H04L 5/10
                    (Continued)

FOREIGN PATENT DOCUMENTS

KR    20200014252       2/2020
WO    WO2020246858     12/2020

OTHER PUBLICATIONS

Intel Corporation, "Multi-TRP enhancements for PDCCH, PUCCH AND PUSCH," R1-2005859, Presented at 3GPP TSG RAN WG1 #102-e, e-Meeting, Aug. 17-28, 2020, 12 pages.
(Continued)

*Primary Examiner* — Peter G Solinsky
(74) *Attorney, Agent, or Firm* — Fish & Richardson P.C.

(57) ABSTRACT

A method and an apparatus of transmitting and receiving a physical downlink control channel (PDCCH) in a wireless communication system is disclosed. A method of receiving a physical downlink control channel (PDCCH) in a wireless communication system according to an embodiment of the present disclosure may include receiving, from a base station, configuration information related to a first search space set and a second search space set for the PDCCH; and receiving, from the base station, the PDCCH for the same downlink control information (DCI) in a first monitoring occasion of the first search space set and a second monitoring occasion of the second search space set. The first monitoring occasion and the second monitoring occasion may be respectively the n-th (n is a natural number) monitoring occasion in a predetermined time duration among one or more monitoring occasions of the first search space set and the second search space set.

15 Claims, 21 Drawing Sheets

(51) Int. Cl.
*H04W 72/0446* (2023.01)
*H04W 72/0453* (2023.01)
*H04W 72/23* (2023.01)

(58) Field of Classification Search
USPC .......................................................... 370/329
See application file for complete search history.

(56) References Cited

U.S. PATENT DOCUMENTS

| 2020/0100248 | A1* | 3/2020 | Kim | H04W 48/12 |
| 2022/0022176 | A1* | 1/2022 | Chen | H04W 72/23 |
| 2022/0078728 | A1* | 3/2022 | Yi | H04W 48/16 |
| 2023/0239125 | A1* | 7/2023 | Yi | H04L 5/0096 |
| | | | | 370/329 |

OTHER PUBLICATIONS

International Search Report in International Appln. No. PCT/KR2021/019336, dated Mar. 29, 2022, 6 pages (with English translation).
MediaTek Inc., "Enhancements on Multi-TRP for PDCCH, PUSCH AND PUCCH," R1-2005621, Presented at 3GPP TSG RAN WG1 #102-e, e-Meeting, Aug. 17-28, 2020, 5 pages.
Oppo, "Enhancements on multi-TRP for PDCCH, PUCCH AND PUSCH," R1-2005984, Presented at 3GPP TSG RAN WG1 #102-e, e-Meeting, Aug. 17-28, 2020, 3 pages.

* cited by examiner

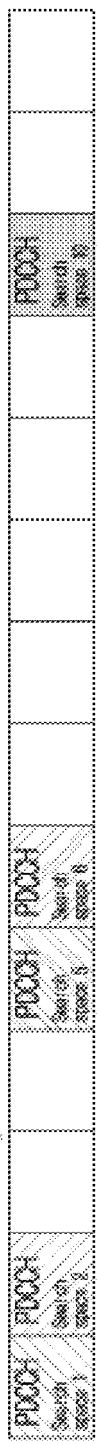
FIG. 10A
FIG. 10B

METHOD AND APPARATUS FOR TRANSMITTING AND RECEIVING PDCCH IN WIRELESS COMMUNICATION SYSTEM

CROSS-REFERENCE TO RELATED APPLICATIONS

This application claims the benefit of earlier filing date and right of priority to U.S. Provisional Application No. 63/128,169, filed on Dec. 20, 2020, Korean Application No. 10-2021-0005885, filed on Jan. 15, 2021, Korean Application No. 10-2021-0008959, filed on Jan. 21, 2021, U.S. Provisional Application No. 63/173,473, filed on Apr. 11, 2021, the contents of which are all hereby incorporated by reference herein in their entirety.

TECHNICAL FIELD

The present disclosure relates to a wireless communication system, and in more detail, relates to a method and an apparatus of transmitting and receiving a physical downlink control channel (PDCCH) for downlink control information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving a physical downlink control channel (PDCCH).

In addition, an additional technical object of the present disclosure is to provide a method and apparatus for transmitting and receiving a PDCCH for the same downlink control information based on multiple transmission and reception points (TRP).

In addition, an additional technical object of the present disclosure is to provide a method and apparatus for determining a monitoring occasion (i.e., search space) to transmit and receive a PDCCH for the same downlink control information.

The technical objects to be achieved by the present disclosure are not limited to the above-described technical objects, and other technical objects which are not described herein will be clearly understood by those skilled in the pertinent art from the following description.

A method of receiving a physical downlink control channel (PDCCH) in a wireless communication system according to an aspect of the present disclosure may include receiving, from a base station, configuration information related to a first search space set and a second search space set for the PDCCH; and receiving, from the base station, the PDCCH for the same downlink control information (DCI) in a first monitoring occasion of the first search space set and a second monitoring occasion of the second search space set. The first monitoring occasion and the second monitoring occasion may be respectively the n-th (n is a natural number) monitoring occasion in a predetermined time duration among one or more monitoring occasions of the first search space set and the second search space set.

A method of transmitting a physical downlink control channel (PDCCH) in a wireless communication system according to an additional aspect of the present disclosure may include transmitting, to a terminal, configuration information related to a first search space set and a second search space set for the PDCCH; and transmitting, to the terminal, the PDCCH for the same downlink control information (DCI) in a first monitoring occasion of the first search space set and a second monitoring occasion of the second search space set. The first monitoring occasion and the second monitoring occasion may be respectively the n-th (n is a natural number) monitoring occasion in a predetermined time duration among one or more monitoring occasions of the first search space set and the second search space set.

According to an embodiment of the present disclosure, reliability and robustness of downlink control information transmission and reception can be improved by transmitting and receiving a PDCCH for the same downlink control information based on multiple TRPs.

In addition, according to an embodiment of the present disclosure, when a PDCCH for the same downlink control information is transmitted based on multiple TRPs, the PDCCH can be stably received by determining a monitoring occasion (i.e., search space) at which the corresponding PDCCH is transmitted.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIGS. 9A and 9B illustrate a method of configuring a search space pair according to an embodiment of the present disclosure.

FIGS. 10A and 10B illustrate a method of configuring a search space pair according to an embodiment of the present disclosure.

FIGS. 11A and 11B illustrate a method of configuring a search space pair according to an embodiment of the present disclosure.

FIGS. 16A and 16B illustrate a method of configuring a search space pair according to an embodiment of the present disclosure.

FIGS. 17A and 17B illustrate a method of configuring a search space pair according to an embodiment of the present disclosure.

DETAILED DESCRIPTION

Figure 1:
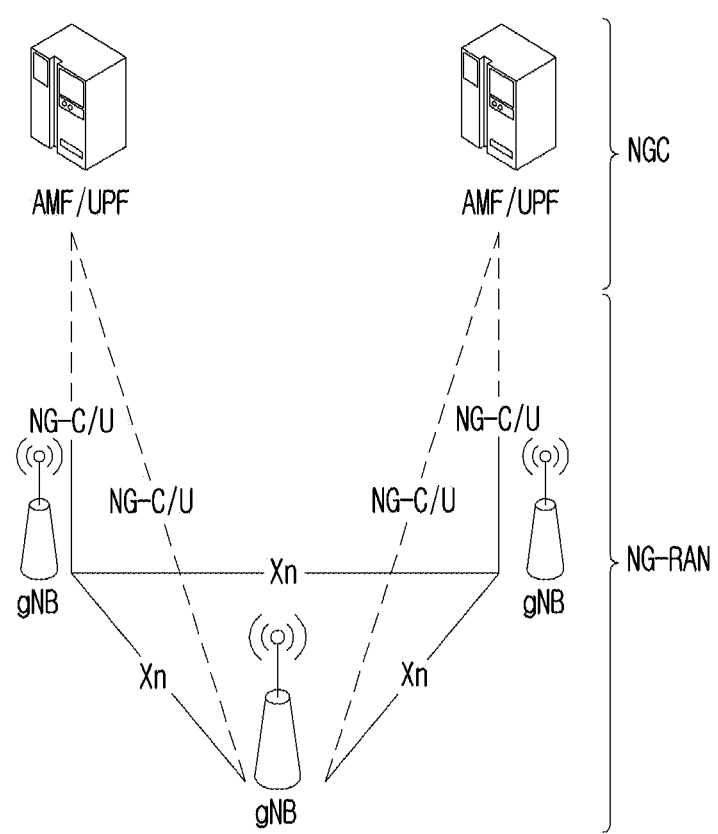
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
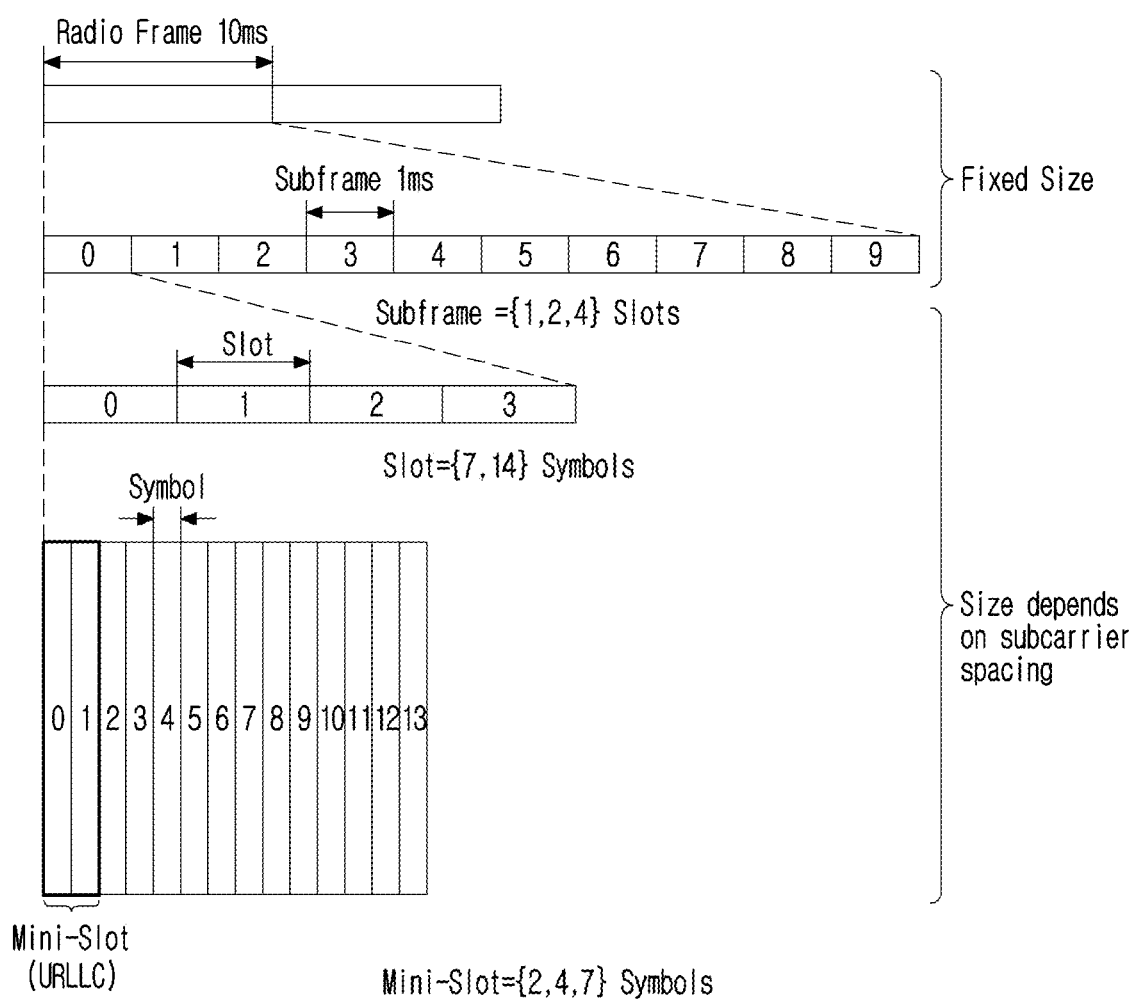
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = 2μ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of Tc=1/(Δfmax·Nf). Here, Δfmax is 480·103 Hz and Nf is 4096. Downlink and uplink transmission is configured (organized) with a radio frame having a duration of Tf=1/(ΔfmaxNf/100)·Tc=10 ms. Here, a radio frame is configured with 10 subframes having a duration of Tsf= (ΔfmaxNf/1000)·Tc=1 ms, respectively. In this case, there may be one set of frames for an uplink and one set of frames for a downlink. In addition, transmission in an uplink frame No. i from a terminal should start earlier by TTA=(NTA+ NTA,offset)Tc than a corresponding downlink frame in a corresponding terminal starts. For a subcarrier spacing configuration μ, slots are numbered in an increasing order of nsμ ∈{0, . . . , Nslotsubframe,μ-1} in a subframe and are numbered in an increasing order of ns,fμ∈{0, . . . Nslotframe, μ-1} in a radio frame. One slot is configured with Nsymbslot consecutive OFDM symbols and Nsymbslot is determined according to CP. A start of a slot nsμ in a subframe is temporally arranged with a start of an OFDM symbol nsμNsymbslot in the same subframe. All terminals may not perform transmission and reception at the same time, which means that all OFDM symbols of a downlink slot or an uplink slot may not be used.

Table 3 represents the number of OFDM symbols per slot (Nsymbslot), the number of slots per radio frame (Nslotframe,μ) and the number of slots per subframe (Nslotsubframe,μ) in a normal CP and Table 4 represents the number of OFDM symbols per slot, the number of slots per radio frame and the number of slots per subframe in an extended CP.

TABLE 3

| μ | Nsymbslot | Nslotframe, μ | Nslotsubframe, μ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | Nsymbslot | Nslotframe, μ | Nslotsubframe, μ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
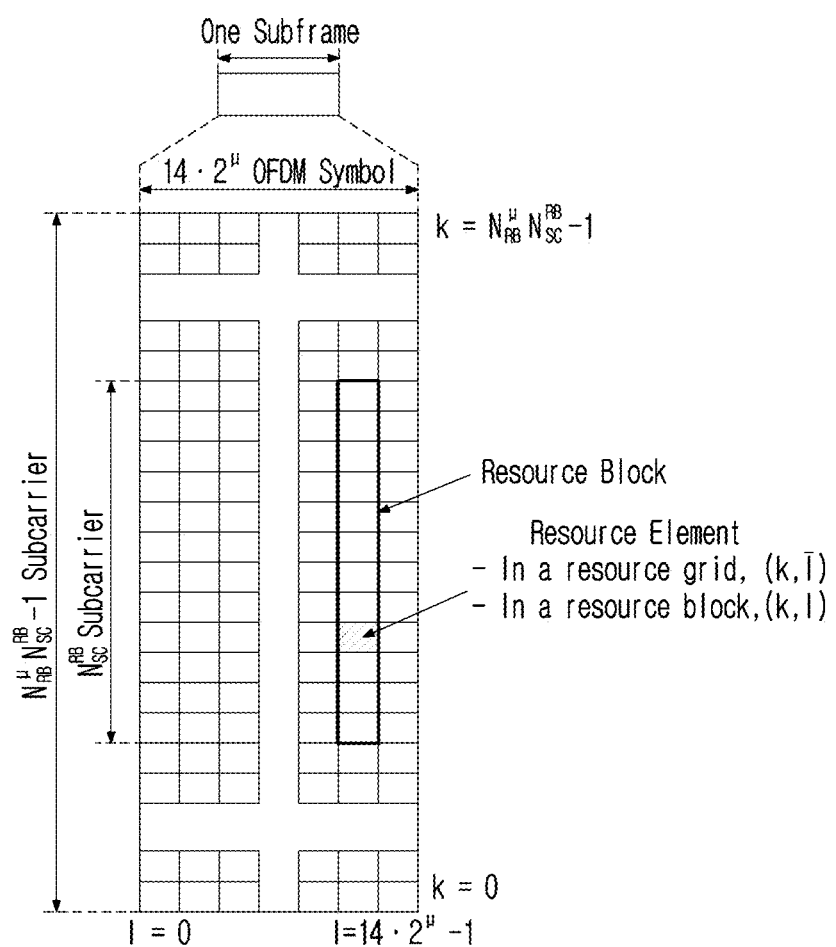
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with NRBμNscRB subcarriers in a frequency domain and one subframe is configured with 14·2μ OFDM symbols, but it is not limited thereto. In an NR system, a transmitted signal is described by OFDM symbols of 2μNsymb(μ) and one or more resource grids configured with NRBμNscRB subcarriers. Here, NRBμ≤NRBmax,μ. The NRBmax, μ represents a maximum transmission bandwidth, which may be different between an uplink and a downlink as well as between numerologies. In this case, one resource grid may be configured per μ and antenna port p.

Each element of a resource grid for µ and an antenna port p is referred to as a resource element and is uniquely identified by an index pair (k,l'). Here, k=0, . . . , NRBµNscRB-1 is an index in a frequency domain and l'=0, . . . , 2µNsymb(µ)-1 refers to a position of a symbol in a subframe. When referring to a resource element in a slot, an index pair (k,l) is used. Here, l=0, . . . , Nsymbµ-1. A resource element (k,l') for µ and an antenna port p corresponds to a complex value, ak,l'(p,µ). When there is no risk of confusion or when a specific antenna port or numerology is not specified, indexes p and µ may be dropped, whereupon a complex value may be ak,l'(p) or ak,l'. In addition, a resource block (RB) is defined as NscRB=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration µ. The center of subcarrier 0 of common resource block 0 for a subcarrier spacing configuration µ is identical to 'point A'. A relationship between a common resource block number nCRBµ and a resource element (k,l) for a subcarrier spacing configuration µ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to NBWP,isize,µ-1 in a bandwidth part (BWP) and i is a number of a BWP. A relationship between a physical resource block nPRB and a common resource block nCRB in BWP i is given by the following Equation 2.

$$n_{CRB}^{\mu} = n_{PRB}^{\mu} + N_{BWP,i}^{start,\mu} \quad \text{[Equation 2]}$$

NBWP,istart,µ is a common resource block that a BWP starts relatively to common resource block 0.

Figure 4:
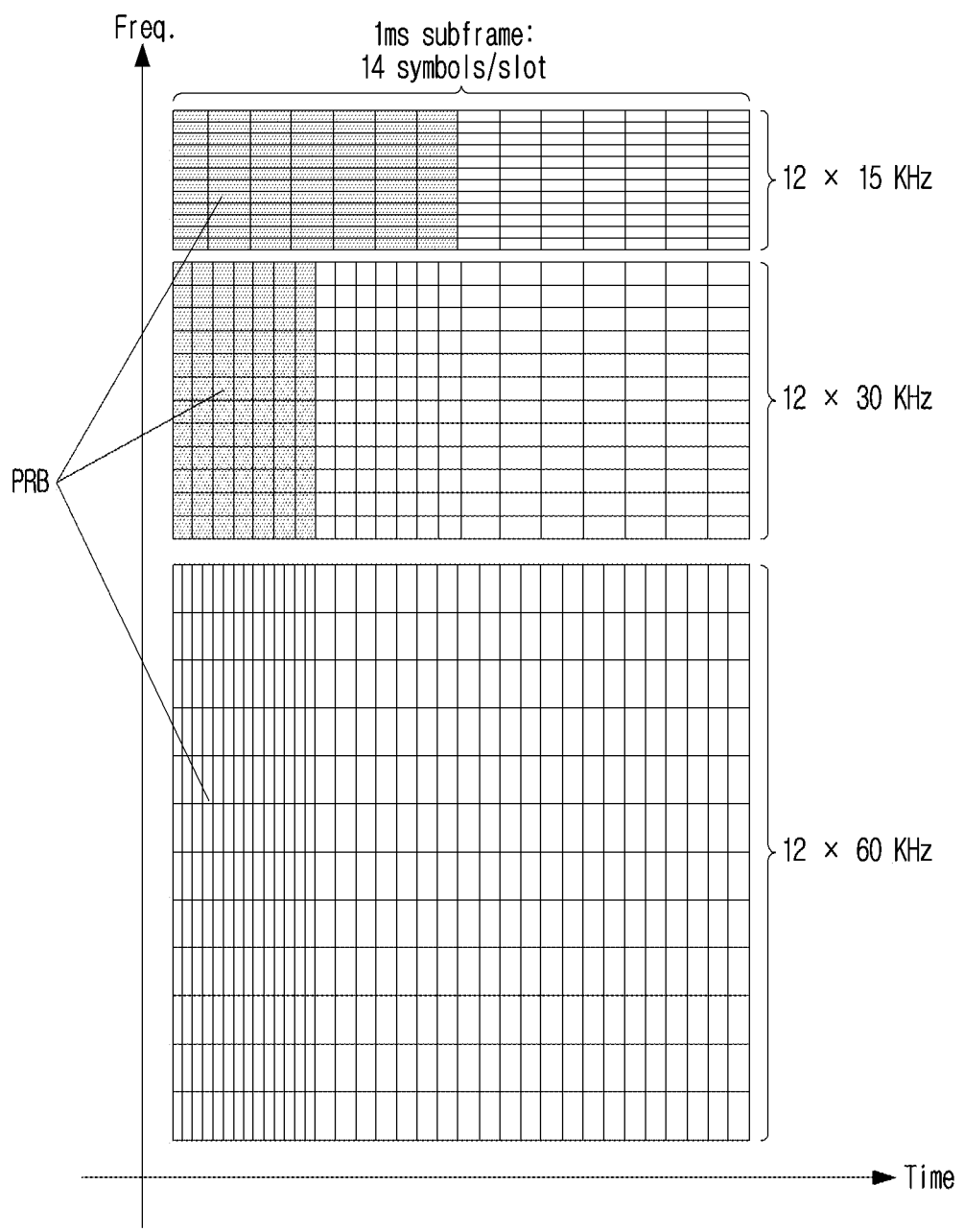
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
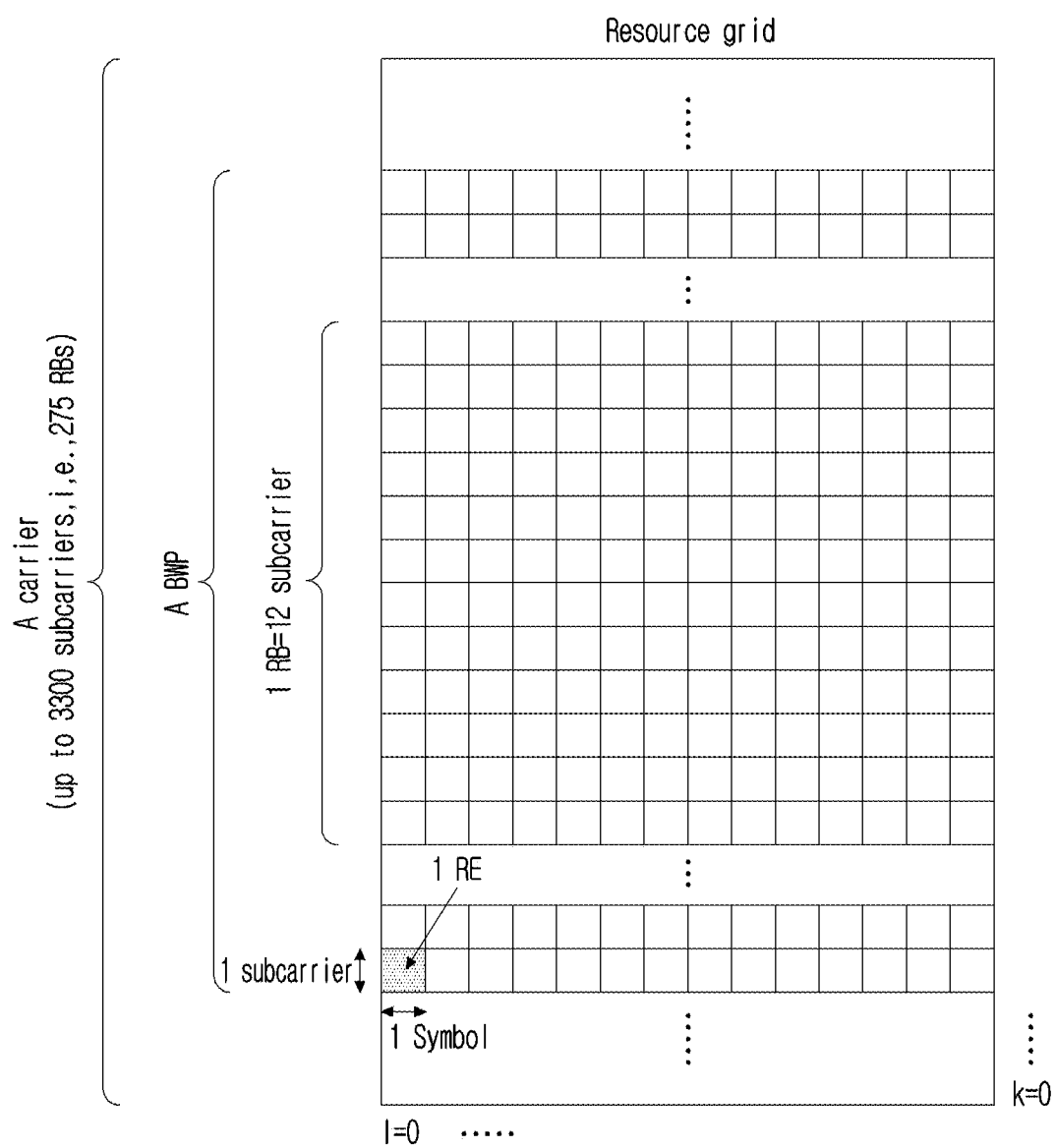
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
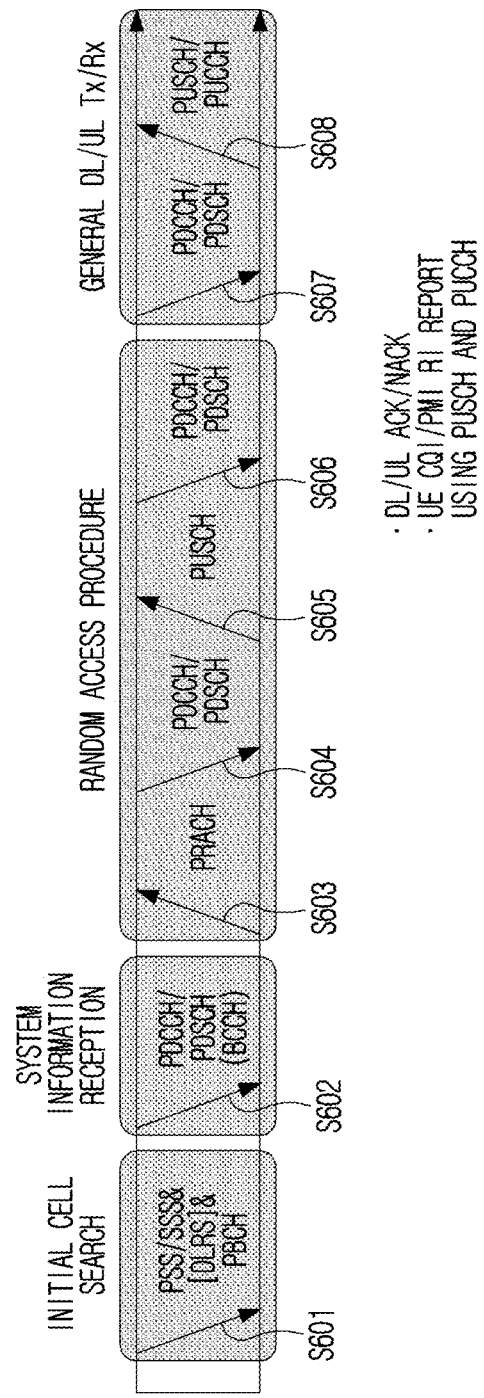
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL(quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission(JT), coordinated Scheduling(CS), coordinated Beamforming (CB), dynamic Point Selection(DPS), dynamic Point Blocking(DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI(multiple DCI) that each TRP transmits different DCIs and ii) M-TRP transmission based on S-DCI(single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets(CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR(scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N(process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7A:
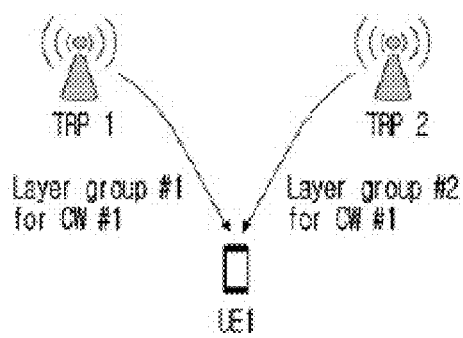
FIGS. 7A and 7B illustrate a method of transmitting multiple TRPs in a wireless communication system to which the present disclosure may be applied.
Figure 7B:
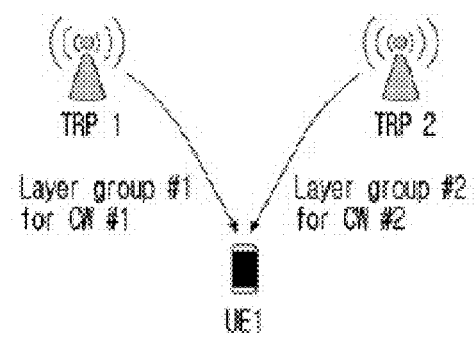

FIGS. 7A and 7B illustrate a method of multiple TRPs transmission in a wireless communication system to which the present disclosure may be applied.

In reference to FIG. 7A, it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7B, an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7B, it may have a disadvantage that a code rate corresponding to a TB is higher compared to FIG. 7A. However, it has an advantage that it may adjust a code rate by indicating a different RV (redundancy version) value or may adjust a modulation order of each CW for encoded bits generated from the same TB according to a channel environment.

According to methods illustrated in FIGS. 7A and 7B above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRP scheduled by at least one DCI may be performed as follows:

i) Scheme 1 (SDM): n (n is a natural number) TCI states in a single slot in overlapping time and frequency resource allocation Scheme 1a: Each transmission occasion is one layer or set of layers of the same TB, and each layer or set of layers is associated with one TCI and one set of DMRS port(s). A single codeword with one redundancy version (RV) is used for all layers or sets of layers. For a UE, different coded bits are mapped to different layers or sets of layers with specific mapping rules.

Scheme 1b: Each transmission occasion is one layer or set of layers of the same TB, and each layer or set of layers is associated with one TCI and one set of DMRS port(s). A single codeword with one RV is used for each spatial layer or set of layers. RVs corresponding to each spatial layer or set of layers may be the same or different.

Scheme 1c: Each transmission occasion is one layer of the same TB having one DMRS port associated with multiple TCI state indices or one layer of the same TB with multiple DMRS ports associated with multiple TCI indices in turn (one by one).

In schemes 1a and 1c described above, the same MCS is applied to all layers or sets of layers.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) is associated with all non-overlapping frequency resource allocations.

Scheme 2a: A single codeword with one RV is used across an entire resource allocation. For UE, a common RB mapping (mapping of codeword to layer) is applied across all resource allocations.

Scheme 2b: A single codeword with one RV is used for each non-overlapping frequency resource allocation. RVs corresponding to each non-overlapping frequency resource allocation may be the same or different.

In scheme 2a, the same MCS is applied to all non-overlapping frequency resource allocations.

iii) Scheme 3 (TDM): n (n is a natural number) TCI states in a single slot in non-overlapping time resource allocation. Each transmission occasion of a TB has one TCI and one RV with time granularity of a mini-slot. All transmission occasion(s) in a slot use a common MCS with the same single or multiple DMRS port(s). An RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) across K slots use a common MCS with the same single or multiple DMRS port(s). An RV/TCI state may be the same or different among transmission occasions.

M-TRP PDCCH Transmission Method

Hereinafter, in the present disclosure, DL MTRP-URLLC means that M-TRPs transmit the same data(e.g., transport block, TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is indicated which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. UE may achieve high reliability because it receives the same data/DCI through resource 1 and resource 2. Such DL MTRP URLLC may be applied to a PDSCH/a PDCCH.

Conversely, UL MTRP-URLLC means that M-TRPs receive the same data/UCI from UE by using a different layer/time/frequency resource. For example, TRP 1 receives the same data/UCI from UE in resource 1 and TRP 2 receives the same data/UCI from UE in resource 2 and shares received data/UCI through a backhaul link connected between TRPs. UE configured with a UL MTRP-URLLC transmission method transmits the same data/UCI by using a different layer/time/frequency resource. Here, UE is indicated which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in methods proposed in the present disclosure, when a specific TCI state (or a TCI) is used (/mapped) in receiving data/DCI/UCI for any frequency/time/space resource, it may mean that a DL estimates a channel from a DMRS by using a QCL type and a QCL RS indicated by a corresponding TCI state in that frequency/time/space resource and receives/demodulates data/DCI to an estimated channel. It may mean that an UL transmits/modulates a DMRS and data/UCI by using a Tx beam and/or Tw power indicated by a corresponding TCI state in that frequency/time/space resource.

The UL TCI state has Tx beam and/or Tx power information of UE and spatial relation information, etc. instead of a TCI state may be configured to UE through other parameter. An UL TCI state may be directly indicated to UL grant DCI or may mean spatial relation information of an SRS resource indicated by an SRI (SRS resource indicator) field of UL grant DCI. Alternatively, it may mean an OL (open loop) Tx power control parameter connected to a value indicated by a SRI field of UL grant DCI (j: an index for open loop parameter Po and alpha($\alpha$) (up to 32 parameter value sets per cell), q_d: an index of a DL RS resource for PL (pathloss) measurement (measurement of up to 3 per cell), 1: a closed loop power control process index (up to 2 processes per cell)).

On the other hand, it is assumed that MTRP-eMBB means that M-TRPs transmit other data by using a different layer/time/frequency, UE configured with a MTRP-eMBB transmission method is indicated multiple TCI states with DCI and data received by using a QCL RS of each TCI state is different data.

In addition, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, it is considered as URLLC transmission and when CRC masking of DCI is performed by using a RNTI for eMBB, it is considered as eMBB transmission. Alternatively, a base station may configure MTRP URLLC transmission/reception or may configure MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel environments. A different TRP may be recognized by UE as a different transmission configuration indication (TCI) state. That is, when UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (the same PDCCH is repetitively or partitively transmitted) and some proposals may be utilized even in a situation where MTRP cooperatively transmits a PDSCH or cooperatively receives a PUSCH/a PUCCH.

In addition, in the present disclosure below, the meaning that a plurality of base stations (i.e., MTRP) repetitively transmits the same PDCCH may mean the same DCI is transmitted by a plurality of PDCCH candidates, and it is equivalent with the meaning that a plurality of base stations repetitively transmits the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N(ACK/NACK) based on a reception time of DCI. Here, if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure below, when a plurality of base stations (i.e., MTRP) divide and transmit the same PDCCH, it may mean that one DCI is transmitted through one PDCCH candidate, but TRP 1 transmits some resources in which the PDCCH candidate is defined and TRP 2 transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits the PDCCH candidate 1 and TRP 2 transmits the PDCCH candidate 2 using different time/frequency resources. After receiving the PDCCH candidate 1 and the PDCCH candidate 2, a UE generates a PDCCH candidate corresponding to aggregation level m1+m2 and attempts DCI decoding.

In summary, it may be as follows that a plurality of base stations (i.e., MTRP) divide/repeat the same PDCCH and transmit over a plurality of monitoring occasions (MO).

i) it may mean that each base station (i.e., STRP) repeatedly transmits coded DCI bits obtained by encoding all DCI contents of a corresponding PDCCH through each MO; or, ii) it may mean that coded DCI bits obtained by encoding all DCI contents of a corresponding PDCCH are divided into a plurality of parts, and each base station (i.e., STRP) transmits a different part through each MO; or iii) it may mean that DCI contents of a corresponding PDCCH are divided into a plurality of parts, and each base station (i.e., STRP) separately encodes different parts and transmits them through each MO.

That is, it may be understood that a PDCCH is transmitted multiple times over several transmission occasions (TO) regardless of repeated transmission or divided transmission of the PDCCH. Here, a TO means a specific time/frequency resource unit in which a PDCCH is transmitted. For example, if a PDCCH is transmitted multiple times (in a specific resource block (RB)) over slots 1, 2, 3, and 4, a TO may mean each slot, or if a PDCCH is transmitted multiple times (in a specific slot) over RB sets 1, 2, 3, and 4, a TO may mean each RB set, or if a PDCCH is transmitted multiple times over different times and frequencies, a TO may mean each time/frequency resource. In addition, a TCI state used for DMRS channel estimation for each TO may be configured differently, and it may be assumed that TOs in which a TCI state is configured differently are transmitted by different TRPs/panels. When a plurality of base stations repeatedly transmits or dividedly transmits a PDCCH, it means that the PDCCH is transmitted over a plurality of TOs, and the union of TCI states configured in corresponding TOs is configured with two or more TCI states. For example, if a PDCCH is transmitted over TOs 1,2,3,4, TCI states 1,2,3,4 may be configured in each of TOs 1,2,3,4, respectively, which means that TRP i transmits cooperatively a PDCCH in TO i.

For a plurality of TOs indicated to a UE to repeatedly transmit or dividedly transmit a PDCCH/PDSCH/PUSCH/PUCCH, UL transmits to a specific TRP or DL receives from a specific TRP in each TO. Here, a UL TO (or TO of TRP 1) transmitted to TRP 1 means a TO using the first value among two spatial relations, two UL TCIs, two UL power control parameters and/or two pathloss reference signals (PLRS) indicated to a UE, and a UL TO (or TO of TRP 2) transmitted to TRP 2 means a TO using the second value among two spatial relations, two UL TCIs, two UL power control parameters and/or two PLRSs indicated to a UE. Similarly, for DL transmission, a DL TO (or TO of TRP 1) transmitted by TRP 1 means a TO using the first value among two DL TCI states (e.g., when two TCI states are configured in CORESET) indicated to a UE, and a DL TO (or TO of TRP 2) transmitted by TRP 2 means a TO using the second value among two DL TCI states (e.g., when two TCI states are configured in CORESET) indicated to a UE.

The proposal of the present disclosure can be extended and applied to various channels such as PUSCH/PUCCH/PDSCH/PDCCH.

The proposal of the present disclosure can be extended and applied to both a case of repeated transmission and a case of divided transmission the channel on different time/frequency/spatial resources.

In NR, in order to provide flexibility for a PDCCH control region, it is not required to configure the PDCCH control region over the system bandwidth. Accordingly, a time/frequency control resource set (CORESET) for searching for downlink control information (DCI) (or for monitoring a PDCCH) may be configured. A CORESET may be divided into a common CORESET and a UE-specific CORESET. A common CORESET may be configured for multiple UEs in one cell, and a UE-specific CORESET may mean a PDCCH control region defined for a specific UE.

For each CORESET, information such as a CORESET index, the number of consecutive symbols that are resource regions in a time domain of a CORESET, a set of resource blocks (RBs) that are resource regions in a frequency domain of a CORESET, an antenna port QCL indicating QCL information of a DM-RS antenna port for PDCCH reception in a corresponding CORESET from a set of antenna port QCLs provided by a TCI state may be provided to a UE by higher layer signaling (e.g., ControlResourceSet).

A set of PDCCH candidates that a UE monitors is defined as PDCCH search space sets. A search space set may be divided into a common search space set (CSS) and a UE-specific search space set (USS).

Each search space (set) may be associated with one CORESET, and one CORESET may be associated with multiple search space sets.

A UE monitors PDCCH candidates in one or more search space sets. That is, a UE monitors a set of PDCCH candidates in one or more CORESETs (i.e., CORESET(s) associated with each configured search space set) on an activated DL BWP on each activated serving cell in which PDCCH monitoring is configured according to search space sets. Here, monitoring includes decoding each PDCCH candidate according to monitored DCI formats.

For each BWP configured to a UE in a serving cell, one or more search space sets may be configured by higher layer signaling to the UE, and for each search space set, information such as a search space index ('searchSpaceId'), association between a corresponding search space set and a CORESET ('controlResourceSetId'), a PDCCH monitoring period and a PDCCH monitoring offset in units of slots ('monitoringSlotPeriodicityAndOffset'), a in-slot PDCCH monitoring pattern indicating the first symbol(s) of a CORESET in a slot for PDCCH monitoring ('monitoringSymbolsWithinSlot') (i.e., a bit string indicates a position of each start symbol(s) where a CORESET starts), the number of slots in which a corresponding search space set exists ('duration') may be provided to a UE by higher layer signaling (e.g., SearchSpace).

A UE determines a PDCCH monitoring occasion (MO) on an activated BWP from a PDCCH monitoring period, a PDCCH monitoring offset and a PDCCH monitoring pattern in a slot. That is, based on a search space set configuration and a CORESET configuration, a UE determines a start symbol(s) of a CORESET associated with a corresponding search space set in one or more slots (consecutive slots in a case of a plurality of slots), and determines how many slot periods this pattern repeats.

Hereinafter, each PDCCH search space(s) included in a search space set in the present disclosure has the same meaning as the above-described PDCCH monitoring occasion (MO). That is, in the present disclosure, a search space may be interpreted/substituted as a monitoring occasion (MO).

In case of M-TRP PDCCH repeated transmission (or the proposed method can be applied when a PDCCH is divided and transmitted), a UE should be aware of which PDCCH candidate transmitted by TRP i is repeatedly transmitted with which PDCCH candidate transmitted by TRP j. This is because a UE needs to soft/hard combine repeatedly transmitted PDCCH candidates in a PDCCH decoding process to increase a decoding success rate. In addition, in case of PDCCH divided transmission, a UE can decode one PDCCH/DCI by combining divided parts only when the UE knows PDCCH candidates that are dividedly transmitted among PDCCH candidates transmitted from TRP i and TRP j.

Here, in order for a UE to recognize a repeatedly transmitted PDCCH candidate, in advance, the UE needs to know a search space pair in which a repeatedly transmitted (or dividedly transmitted) PDCCH candidate can exist among PDCCH search spaces of TRP i and PDCCH search spaces of TRP j.

Figure 8:
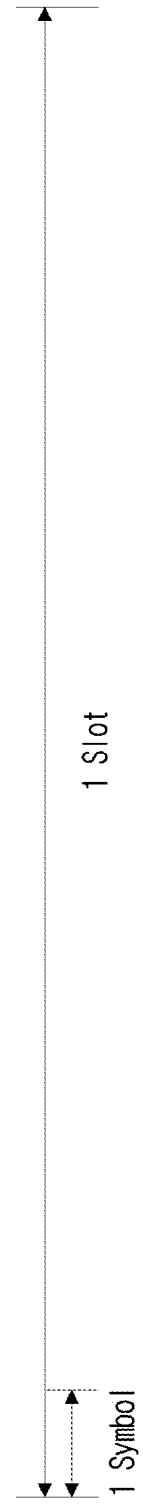
FIG. 8 is a diagram illustrating a method of configuring a search space set in a wireless communication system to which the present disclosure may be applied.

FIG. 8 is a diagram illustrating a method of configuring a search space set in a wireless communication system to which the present disclosure may be applied.

In FIG. 8, a case in which two TRPs (e.g., two base stations) repeatedly transmit a PDCCH is exemplified. In order for two TRPs to perform repeated PDCCH transmission, CORESET 1 and search space set 1 corresponding to TRP 1, and CORESET 2 and search space set 2 corresponding to TRP 2 may be configured to a UE.

In addition, QCL information corresponding to TRP 1 and 2 may be configured in CORESET 1 and 2, respectively. That is, a TCI state (e.g., TCI state 1) including QCL information of TRP 1 may be configured in CORESET 1 (e.g., by higher layer signaling 'ControlResourceSet'), and a TCI state (e.g., TCI state 2) including QCL information of TRP 2 may be configured in CORESET 2 (e.g., by higher layer signaling 'ControlResourceSet').

In FIG. 8, for convenience of description, only a pattern in 1 slot is exemplified among all patterns of CORESET 1 and search space set 1 for TRP 1 and CORESET 2 and search space set 2 for TRP 2. One slot may include 14 OFDM symbols, and in the description of the present disclosure below, it is assumed that indexes of each OFDM symbol in one slot are assigned from 1 to 14 in time order.

In addition, for convenience of description, it is assumed that a length of a time domain of a PDCCH candidate is all one symbol. Similarly, it is assumed that one search space (or MO) is also 1 symbol. In addition, it is assumed that a search space(s) (i.e., MO) in one slot is configured in the same pattern as in FIG. 8, and the same pattern is repeated in N slots (N is a natural number) period. However, this time unit is only an example, and the proposed method of the present disclosure may be applied to other time units.

Several PDCCH candidates may be configured in each search space, and a UE performs blind decoding on a corresponding PDCCH candidate.

As another example, in order for two TRPs to perform repeated PDCCH transmission, one CORESET 1 may be configured for a UE, and search space set 1 and search space set 2 may be configured/linked to the CORESET 1. In addition, both QCL information for TRP 1 and QCL information for TRP 2 may be configured in CORESET 1. That is, both a TCI state (e.g., TCI state 1) including QCL information of TRP 1 and a TCI state (e.g., TCI state 2) including QCL information of TRP 2 are configured in CORSET 1. In addition, search space set 1 may be used for transmitting a PDCCH using TCI state 1, and search space set 2 may be used for transmitting a PDCCH using TCI state 2.

In addition, when search space set 1 and search space set 2 are configured for PDCCH repeated (or divided) transmission, the search space set 1 and the search spaces set 2 may be associated/linked with the same single CORESET. Here, if one TCI state (i.e., one QCL information) for PDCCH reception is configured in the one CORESET, this may correspond to PDCCH repeated (or divided) transmission of a single TRP (i.e., S-TRP operation).

Hereinafter, in the present disclosure, a case in which 2 CORESETs are configured to a UE is mainly described as an example for convenience of description, but it can be extended and applied when two TCI states are configured in one CORESET. That is, search space set 1 and search space set 2 may be associated/linked with one CORESET, and two TCI states may be configured in the CORESET. In this case, in the example of 2 CORESETs mentioned in the present disclosure, CORESET 1 may be substituted with a CORESET configured with a first TCI state, and CORESET 2 may be substituted with a CORESET configured with a second TCI state.

A UE may be configured with CORESET 1, CORESET 2, search space set 1 and/or search space set 2 used for MTRP PDCCH transmission from a base station.

For example, a UE may be configured with a linkage or association between search space set 1 and search space set 2 by higher layer signaling (e.g., RRC signaling). In this case, if a linkage/association is configured between a plurality of search space sets, a UE may determine that there is a PDCCH that is repeatedly transmitted (or dividedly transmitted) in the plurality of search space sets. Here, for example, search space sets linked/associated with each other may have the same search space type (e.g., USS or CSS). In addition, search space sets linked/associated with each other may have the same DCI format to be monitored. In addition, search space sets linked/associated with each other may have the same period/offset and may have the same duration.

In addition, as described above, by a configuration for each search space set, a UE may be configured with a CORESET associated with the corresponding search space set.

For one or more search space (SS) included in search space sets (SS set) 1 and 2 (i.e., MTRP SS sets), the following methods for determining a PDCCH SS pair in which a repeatedly transmitted PDCCH candidate may be included are proposed.

Embodiment 1

First, a maximum time interval N time unit (TU) (e.g., OFDM symbol) between PDCCH SS pairs may be configured. Here, the N value may be configured and indicated to a UE by a base station, fixed to a specific value, determined according to UE capability, or reported as UE capability.

A UE determines/identifies an SS (hereinafter referred to as SS p for convenience of description) that appears first in time sequence (and not yet paired with any SS) among SSs of an SS set having a specific search space set ID (SS set ID (identity)) in MTRP SS sets (i.e., SS set 1, 2). In addition, N TU (e.g., N symbol) may be configured/determined based on the first OFDM symbol (e.g., OFDM symbol k) of the corresponding SS p, hereinafter, this is referred to as a window (or time window) (e.g., OFDM symbols k, k+1, k+2, ..., k+N).

Specifically, N=0 is configured, or a window may be limited only to OFDM symbols of SS p. In this case, a MTRP PDCCH may be FDMed without TDM, or repeated MTRP PDCCH transmission may not be applied. For example, if only TDM of a MTRP PDCCH is supported, and if N=0 is configured or a window is limited only to OFDM symbols of SS p, this may mean that MTRP PDCCH repeated transmission is not applied/configured.

Here, as an example of a specific SS set ID, the lowest SS set ID or the highest SS set ID may correspond. Alternatively, when a window is configured based on a specific SS set ID, a base station may indicate the specific SS set ID to a UE. Alternatively, an SS set may be selected based on a CORESET ID associated/linked with the SS set instead of an SS set ID, and a window may be configured based on the selected SS set. For example, a window may be configured based on an SS set associated/linked with a CORESET having the lowest ID (or the highest ID or the ID indicated by a base station) among two CORESETs configured for MTRP PDCCH repeated transmission.

Hereinafter, for convenience of description, it is assumed that a window is configured based on the lowest SS set ID.

If an SS (hereinafter, referred to as SS q for convenience of description) of the remaining SS set (i.e., the remaining SS set except the lowest SS set ID) of MTRP SS sets exists within a time window, SS p and SS q may be an SS pair.

Here, existence of SS q in a window may mean a case in which the first OFDM symbol of SS q is included in/belongs to a window, or a case in which the last OFDM symbol of SS q is included in/belongs to a window.

If there are a plurality of SS q in a window, SS p may be paired with SS q that appears first in time.

If there are a plurality of remaining SS sets (i.e., the rest except the lowest SS set ID) of MTRP SS sets (i.e., 3 TRP or more (e.g., n TRP, n is a natural number) MTRP PDCCH transmission case), SS q (e.g., q1, q2, q3, ..., qn) is found through the above process for each SS set of the remaining SS sets, and p and q1, q2, q3, ..., qn may all be paired.

If this q does not exist in a window, since SS p is not paired with an SS of another SS set, it can be used for single TRP PDCCH transmission as the existing operation.

Thereafter, a UE may configure a window for an SS that appears next in time order (that are not yet paired) among SSs of an SS set with the lowest SS set ID in MTRP SS sets (i.e., SS set 1, 2), and repeat a process of searching for an SS pair.

A UE having determined an SS pair in the above manner may monitor repeatedly transmitted PDCCH candidates for detection of a DCI format in the corresponding SS pair in the linked/associated SS sets.

Figures 9A, 9B:
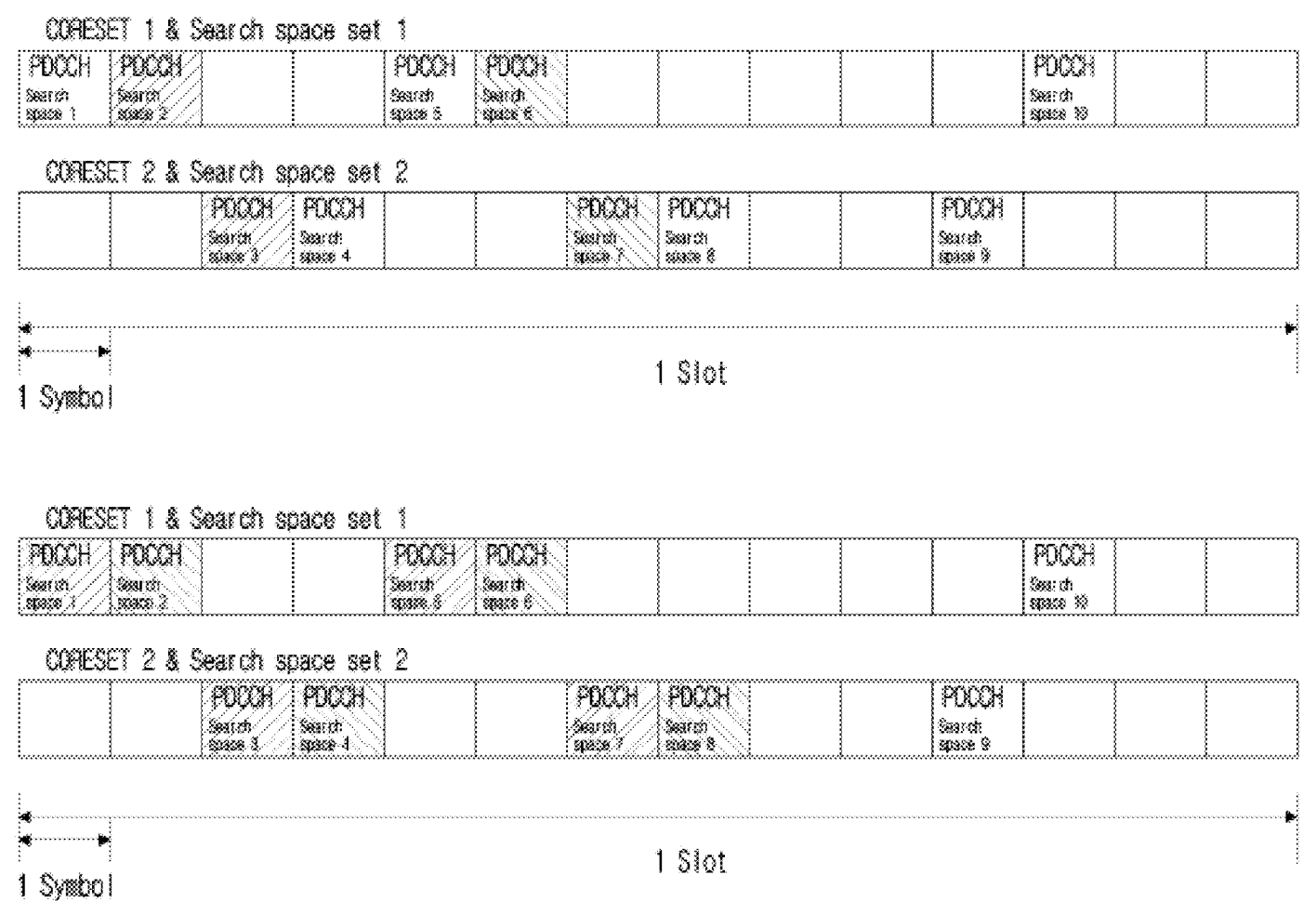

FIGS. 9A and 9B illustrate a method of configuring a search space pair according to an embodiment of the present disclosure.

In FIGS. 9A and 9B, it is assumed that CORESET 1, SS set (search space set) 1 for TRP 1 is configured to a UE, and CORESET 2, SS set 2 for TRP 1 are configured to a UE as in FIG. 8. Accordingly, the description of FIG. 8 above for the CORESET and the SS set may be equivalently applied.

FIG. 9A exemplifies a case in which the Embodiment 1 is applied when a window (i.e., N TU)=1 symbol, and FIG. 9B exemplifies a case in which the Embodiment 1 is applied when a window (i.e., N TU)=2 symbols.

In reference to FIG. 9A, SS (search space) 1 is not paired because an SS corresponding to SS set 2 does not exist in a window (i.e., OFDM symbols 1, 2). In addition, for SS 2, since SS 3 corresponding to SS set 2 exists in a window (i.e., OFDM symbols 2, 3), SS 2 and SS 3 are paired.

Similarly, SS 5 is not paired because SS set 2 does not exist in a window (i.e., OFDM symbols 5, 6). For SS 6, since SS 7 corresponding to SS set 2 exists in a window (i.e., OFDM symbols 6, 7), SS 6 and SS 7 are paired.

Similarly, SS 10 is not paired because SS set 2 does not exist in a window (i.e., OFDM symbols 12, 13).

In reference to FIG. 9B, for SS 1, since SS 3 corresponding to SS set 2 exists in a window (i.e., OFDM symbols 1, 2, 3), SS 1 and SS 3 are paired.

Similarly, for SS 2, since SS 4 corresponding to SS set 2 exists in a window (i.e., OFDM symbols 2, 3, 4), SS 2 and SS 4 are paired. Here, since SS 3 has already been paired with SS 1, it is not considered when searching for a pair of SS 2.

Similarly, for SS 5 and 6, since SS set 2 exists in each window (i.e., OFDM symbols 5, 6, 7 for SS 5, OFDM symbols 6, 7, 8 for SS 6), SS 5 is paired with SS 7, and SS 6 is paired with SS 8.

SS 10 is not paired because SS set 2 does not exist in a window (i.e., OFDM symbols 12, 13, 14).

Embodiment 2

In the Embodiment 1, a window may be configured to a UE based on an SS of an SS set having a specific SS set ID (e.g., the lowest SS set ID, the highest SS set ID, SS set ID indicated by a base station, etc.) in MTRP SS sets (i.e., SS sets 1 and 2). On the other hand, in the Embodiment 2, a window may be configured based on all SSs of MTRP SS sets (i.e., SS sets 1 and 2). An SS pair may be determined/configured in the same method as in the above-described Embodiment 1 except for the difference from the Embodiment 1.

A UE determines/identifies an SS (hereinafter referred to as SS p for convenience of description) that appears first in time sequence (and not yet paired with any SS) among SSs of MTRP SS sets (i.e., SS set 1, 2). In addition, N TU (e.g., N symbol) may be configured/determined based on the first OFDM symbol (e.g., OFDM symbol k) of the corresponding SS p, hereinafter, this is referred to as a window (or time window) (e.g., OFDM symbols k, k+1, k+2, . . . , k+N).

Specifically, N=0 is configured, or a window may be limited only to OFDM symbols of SS p. In this case, a MTRP PDCCH may be FDMed without TDM, or repeated MTRP PDCCH transmission may not be applied. For example, if only TDM of a MTRP PDCCH is supported, and if N=0 is configured or a window is limited only to OFDM symbols of SS p, this may mean that MTRP PDCCH repeated transmission is not applied/configured.

If an SS (hereinafter, referred to as SS q for convenience of description) of the remaining SS set (i.e., the remaining SS set except for the SS set of SS p) of MTRP SS sets exists within a time window, SS p and SS q may be an SS pair.

Here, existence of SS q in a window may mean a case in which the first OFDM symbol of SS q is included in/belongs to a window, or a case in which the last OFDM symbol of SS q is included in/belongs to a window.

If there are a plurality of SS q in a window, SS p may be paired with SS q that appears first in time.

If there are a plurality of remaining SS sets other than the SS set of SS p among MTRP SS sets (i.e., 3 TRP or more (e.g., n TRP, n is a natural number) MTRP PDCCH transmission case), SS q (e.g., q1, q2, q3, . . . , qn) is found through the above process for each SS set of the remaining SS sets, and p and q1, q2, q3, . . . , qn may all be paired.

If this q does not exist in a window, since SS p is not paired with an SS of another SS set, it can be used for single TRP PDCCH transmission as existing method.

Thereafter, a UE may configure a window for an SS that appears next in time order (that are not yet paired) among SSs in MTRP SS sets (i.e., SS set 1, 2), and repeat a process of searching for an SS pair.

A UE having determined an SS pair in the above manner may monitor repeatedly transmitted PDCCH candidates for detection of a DCI format in the corresponding SS pair in the linked/associated SS sets.

FIGS. 10A and 10B illustrate a method of configuring a search space pair according to an embodiment of the present disclosure.

In FIGS. 10A and 10B, it is assumed that CORESET 1, SS set (search space set) 1 for TRP 1 is configured to a UE, and CORESET 2, SS set 2 for TRP 1 are configured to a UE as in FIG. 8. Accordingly, the description of FIG. 8 above for the CORESET and the SS set may be equivalently applied.

FIG. 10A exemplifies a case in which the Embodiment 2 is applied when a window (i.e., N TU)=1 symbol, and FIG. 10B exemplifies a case in which the Embodiment 2 is applied when a window (i.e., N TU)=2 symbols.

In reference to FIG. 10A, SS 1 is not paired because SS set 2 does not exist in a window (i.e., OFDM symbols 1, 2). In addition, for SS 2, since SS 3 corresponding to SS set 2 exists in a window (i.e., OFDM symbols 2, 3), SS 2 and SS 3 are paired.

For SS 4, since SS 5 corresponding to SS set 1 exists in a window (i.e., OFDM symbols 4, 5), SS 4 and SS 5 are paired.

For SS 6, since SS 7 corresponding to SS set 2 exists in a window (i.e., OFDM symbols 6, 7), SS 6 and SS 7 are paired.

SS 8 is not paired because SS set 1 does not exist in a window (i.e., OFDM symbols 8, 9).

For SS 9, since SS 10 corresponding to SS set 1 exists in a window (i.e., OFDM symbols 11, 12), SS 9 and SS 10 are paired.

In reference to FIG. 10B, for SS 1, since SS 3 corresponding to SS set 2 exists in a window (i.e., OFDM symbols 1, 2, 3), SS 1 and SS 3 are paired.

For SS 2, since SS 4 corresponding to SS set 2 exists in a window (i.e., OFDM symbols 2, 3, 4), SS 2 and SS 4 are paired.

Similarly, for SS 5 and 6, since SS set 2 exists within each window (i.e., OFDM symbols 5, 6, 7 for SS 5, OFDM symbols 6, 7, 8 for SS 6), SS 5 is paired with SS 7, and SS 6 is paired with SS 8.

For SS 9, since SS 10 corresponding to SS set 1 exists in a window (i.e., OFDM symbols 11, 12, 13), SS 9 and SS 10 are paired.

Meanwhile, in order to exclude inter-slot MTRP PDCCH transmission in the Embodiments 1 and 2 above, a window may be limited to not crossing a slot boundary. That is, if a window crosses a slot boundary, the proposed method may be applied by truncating the window to the symbol before crossing the slot boundary.

Embodiment 3

In the Embodiments 1 and 2, when a search space corresponding to a reference is configured according to a time sequence, a window is configured based on the corresponding search space.

Differently from this, in the Embodiment 3, when a window is fixed (or configured) as a specific TU unit (e.g., 1 slot), a method for determining an SS pair is proposed. The n-th SS of SS set 1 that appears in time order in a window may be paired with the n-th SS of SS set 2 that appears in time order in the same window. When MTRP SS sets include three or more SS sets (i.e., when three or more TRPs perform repeated PDCCH transmission), n-th SSs of each SS set may be paired in a window. The UE may search for an SS pair by repeating this process for each TU.

That is, for SS sets linked/associated with each other, SSs having the same index in time order of each of the linked/associated SS sets in a window may be paired (i.e., the n-th SS of SS set 1 and the n-th SS of SS set 2 in time order in a window). A UE may monitor a PDCCH candidate for detection of a DCI format in the paired SSs.

Here, for example, a base station may determine a window and indicate the window to a UE. Alternatively, a UE reports a window value to a base station as UE capability, and a window may be determined based on the reported value. Alternatively, a window may be fixed to a predefined specific value (e.g., 1 slot, etc.).

Figures 11A, 11B:
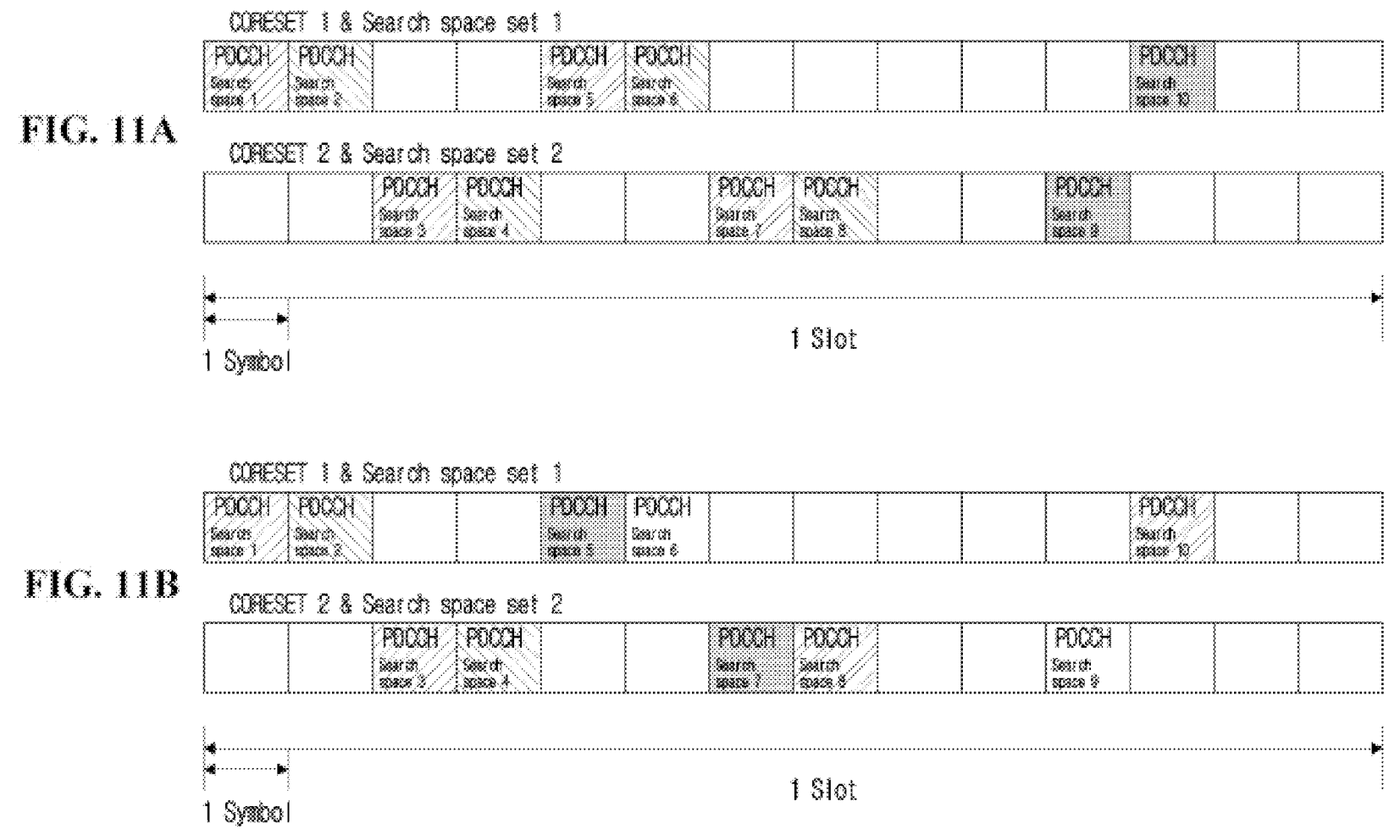

FIGS. 11A and 11B illustrate a method of configuring a search space pair according to an embodiment of the present disclosure.

In FIGS. 11A and 11B, it is assumed that CORESET 1, SS set (search space set) 1 for TRP 1 is configured to a UE, and CORESET 2, SS set 2 for TRP 1 are configured to a UE as in FIG. 8. Accordingly, the description of FIG. 8 above for the CORESET and the SS set may be equivalently applied.

FIG. 11A exemplifies a case in which the Embodiment 3 is applied when a window=1 slot, and FIG. 11B exemplifies a case in which the Embodiment 3 is applied when a window=1 half slot (i.e., 7 symbols).

In reference to FIG. 11A, since each SS has a length of 1 symbol, for SS set 1, SSs 1, 2, 5, 6, and 10 are configured as the first SS (i.e., SS of index 1 in a window), the second SS (i.e., SS of index 2 in a window), the third SS (i.e., SS of index 3 in a window), the fourth SS (i.e., SS of index 4 in a window), the fifth SS (i.e., SS of index 5 in a window), respectively, in time order. In addition, for SS set 2, SSs 3, 4, 7, 8, and 9 are configured as the first SS (i.e., SS of index 1 in a window), the second SS (i.e., SS of index 2 in a window), the third SS (i.e., SS of index 3 in a window), the fourth SS (i.e., SS of index 4 in a window), the fifth SS (i.e., SS of index 5 in a window), respectively, in time order.

Since a pair is configured between the n-th SSs of each SS set, 5 SS pairs corresponding to (SS 1, SS 3), (SS 2, SS 4), (SS 5, SS 7), (SS 6, SS 8) and (SS 9, SS 10) are configured.

As shown in FIG. 11A, SS sets linked/associated with each other may have the same number of SSs (i.e., MOs) in one window.

In reference to FIG. 11B, for SS set 1 in the first half slot of FIG. 11B, search spaces 1, 2, 5 and 6 are configured as the first SS (i.e., SS of index 1 in a window), the second SS (i.e., SS of index 2 in a window), the third SS (i.e., SS of index 3 in a window), the fourth SS (i.e., SS of index 4 in a window), respectively, in time order. In addition, for SS set 2, search spaces 3, 4 and 7 are configured as the first SS (i.e., SS of index 1 in a window), the second SS (i.e., SS of index 2 in a window), the third SS (i.e., SS of index 3 in a window), respectively, in time order.

Since a pair is configured between the n-th SSs of each SS set, 3 SS pairs corresponding to (SS 1, SS 3), (SS 2, SS 4) and (SS 5, SS 7) are configured.

In addition, for SS set 1 in the second half slot of FIG. 11B, SS 10 is configured as the first SS (i.e., SS of index 1 in a window) in time order, and for SS set 2, SSs 8, 9 are configured as the first SS (i.e., SS of index 1 in a window), the second SS (i.e., SS of index 2 in a window), respectively, in time order.

Since a pair is configured between the n-th SSs of each SS set, 1 SS pair corresponding to (SS 8, SS 10) is configured.

As shown in FIG. 11B, SS sets linked/associated with each other may have different numbers of SSs (i.e., MOs) in one window.

Meanwhile, in the above-described Embodiment 3, additionally, the maximum value (=r) of the number of SS pairs in a window may be configured. Here, for example, a base station may determine r and signal r to a UE (e.g., higher layer signaling). Alternatively, a UE may report a value of r to a base station as UE capability. For example, when r=2, since the number of SS pairs in the first half slot in FIG. 11B exceeds the value r, (SS 5, SS 7) pair may be excluded from the SS pair. In this case, (SS 5, SS 7), (SS 6, SS 8), (SS 9, SS 10) may also be excluded from the SS pair in FIG. 11B.

If a size of a window exceeds 1 slot, the SS pair may exist in different slots. In this case, MTRP PDCCH transmission may support inter-slot transmission.

Embodiment 4

In the Embodiment 4, similarly to the Embodiment 3, when a window is fixed (or configured) in a specific TU unit (e.g., 1 slot), a method for determining an SS pair is proposed. However, unlike the Embodiment 3 in which paring is performed in time order, in the Embodiment 4, a base station may indicate information (i.e., information on SS available for repeated MTRP transmission) on SS paired in a window to a UE through signaling (e.g., higher layer signaling, dynamic signaling such as DCI).

For example, a base station may signal to a UE by distinguishing between an SS that can be used for repeated MTRP PDCCH transmission for each SS set and an SS that is not used for repeated MTRP PDCCH transmission for each SS set. This will be described with reference to the drawings below.

Figure 12:
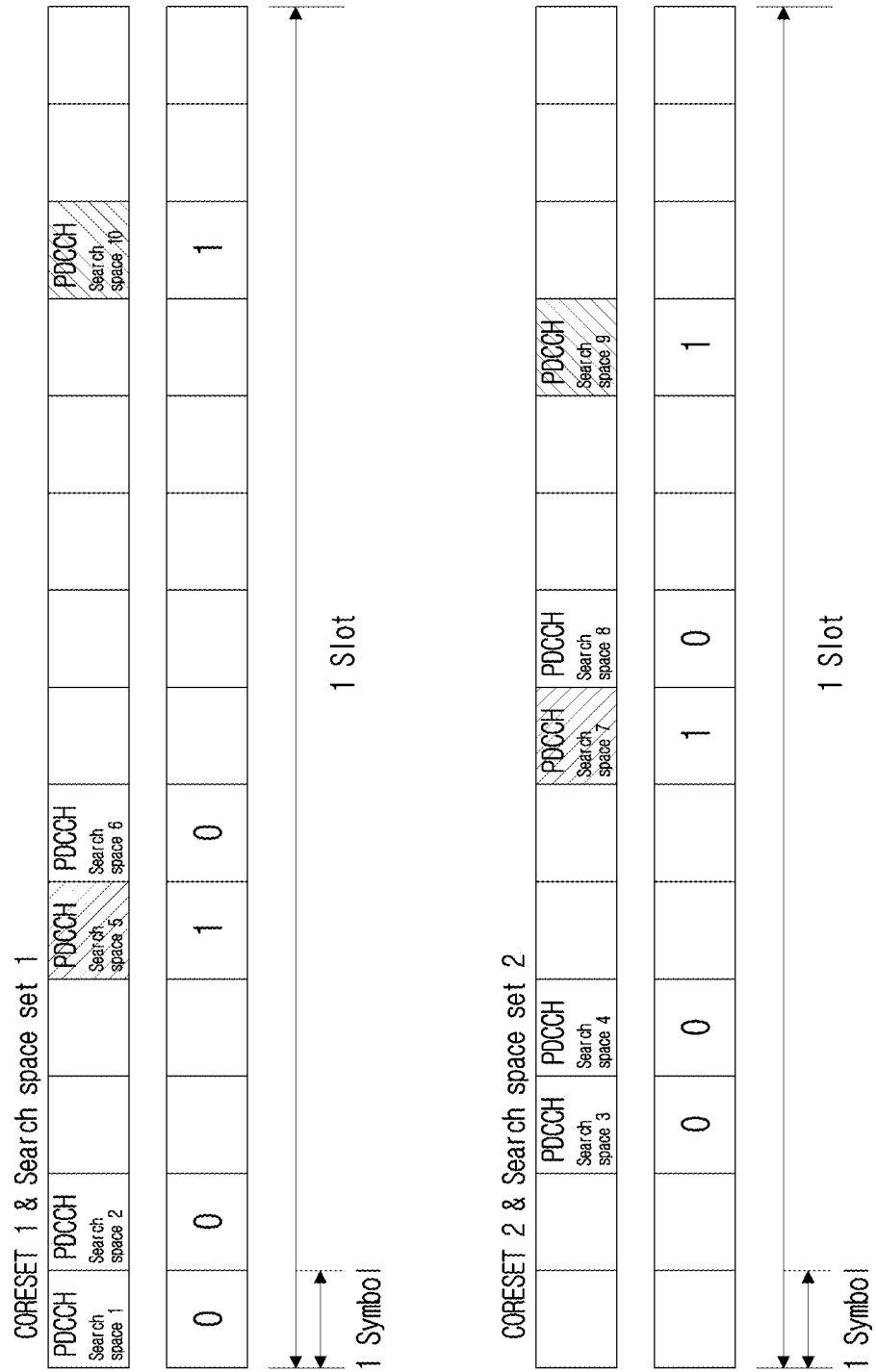
FIG. 12 illustrates a method of configuring a search space pair according to an embodiment of the present disclosure.

FIG. 12 illustrates a method of configuring a search space pair according to an embodiment of the present disclosure.

In FIG. 12, it is assumed that CORESET 1, SS set (search space set) 1 for TRP 1 is configured to a UE, and CORESET 2, SS set 2 for TRP 1 are configured to a UE as in FIG. 8.

Accordingly, the description of FIG. 8 above for the CORESET and the SS set may be equivalently applied.

FIG. 12 illustrates a case in which the Embodiment 4 is applied when a window=1 slot.

As described above, when a base station signals to a UE by distinguishing between an SS that can be used for repeated MTRP PDCCH transmission for each SS set and an SS that is not used for repeated MTRP PDCCH transmission for each SS set, a bitmap method may be used.

In reference to FIG. 12, assuming that a window is 1 slot, a base station may set a bit value of a bitmap corresponding to an SS that can be used for repeated MTRP PDCCH transmission among SSs 1, 2, 5, 6, and 10 appearing in (belonging to) SS set 1 in FIGS. 11A and 11B to '1', and set a bit value of the bitmap corresponding to the other SS to '0'. Similarly, a base station may indicate an SS that can be used for repeated transmission in a bitmap for SS set 2 as well.

In FIG. 12, for example, it is assumed that bit values of a bitmap corresponding to SS 5 and 10 of SS set 1 and SS 7 and 9 of SS set 2 are set to '1', and bit values of a bitmap corresponding to the remaining SS are set to '0'. In this case, among the SSs whose bit values are set to 1, SSs belonging to different SS sets are paired in time order. That is, SS 5 and SS 7 corresponding to the first SS are paired, and SS 9 and SS 10 corresponding to the second SS are paired in time order.

If three or more TRPs perform repeated transmission, SSs in which bit values of a bitmap belonging to different SS sets are set to 1 may be paired in time order.

In addition, unlike the above-described bitmap method, a base station may directly indicate to a UE which SSs of each SS set are paired with each other in a window. For example, it may be indicated to a UE that the third SS of SS set 1 and the third SS of SS set 2 are paired in a window, and the fifth SS of SS set 1 and the fifth SS of SS set 2 are paired in the window. For example, pair index information may be optionally configured in configuration information of an SS, and through this, it may be indicated that SSs having the same pair index is a pair (in the same component carrier (CC)/bandwidth part (BWP)). If a pair index is not configured, it may mean an SS without a pair as the existing operation.

A UE having determined an SS pair in the above manner may monitor repeatedly transmitted PDCCH candidates for detection of a DCI format in the corresponding SS pair in the linked/associated SS sets.

Embodiment 5

A UE determines/identifies an SS (hereinafter referred to as SS p for convenience of description) that appears first in time sequence (and not yet belong to any window) among SSs of an SS set having a specific SS set ID in MTRP SS sets (i.e., SS set 1, 2). In addition, N TU (e.g., N symbol) may be configured/determined based on the first OFDM symbol (e.g., OFDM symbol k) of the corresponding SS p, hereinafter, this is referred to as a window (or time window) (e.g., OFDM symbols k, k+1, k+2, . . . , k+N). Since the N TU configuration method is the same as that of the Embodiment 1, a description thereof will be omitted.

Here, as an example of a specific SS set ID, the lowest SS set ID or the highest SS set ID may correspond. Alternatively, when a window is configured based on a specific SS set ID, a base station may indicate the specific SS set ID to a UE. Alternatively, an SS set may be selected based on a CORESET ID associated/linked with the SS set instead of an SS set ID, and a window may be configured based on the selected SS set. For example, a window may be configured based on an SS set associated/linked with a CORESET having the lowest ID (or the highest ID or the ID indicated by a base station) among two CORESETs configured for MTRP PDCCH repeated transmission.

Hereinafter, for convenience of description, it is assumed that a window is configured based on the lowest SS set ID.

The n-th SS of SS set 1 that appears in time order in a window may be paired with the n-th SS of SS set 2 that appears in time order in the same window. When MTRP SS sets include three or more SS sets (i.e., when three or more TRPs perform repeated PDCCH transmission), n-th SSs of each SS set may be paired in a window.

Meanwhile, additionally, the maximum value (=r) of the number of SS pairs in a window may be configured. Here, for example, a base station may determine r and signal r to a UE (e.g., higher layer signaling). Alternatively, a UE may report a value of r to a base station as UE capability.

Thereafter, a UE configures a window in the same manner as above for the next SS in time order that does not exist in any window among SSs having a specific SS set ID in MTRP SS sets (i.e., SS sets 1 and 2), and repeat a process of searching for an SS pair.

A UE having determined an SS pair in the above manner may monitor repeatedly transmitted PDCCH candidates for detection of a DCI format in the corresponding SS pair in the linked/associated SS sets.

Figure 13:
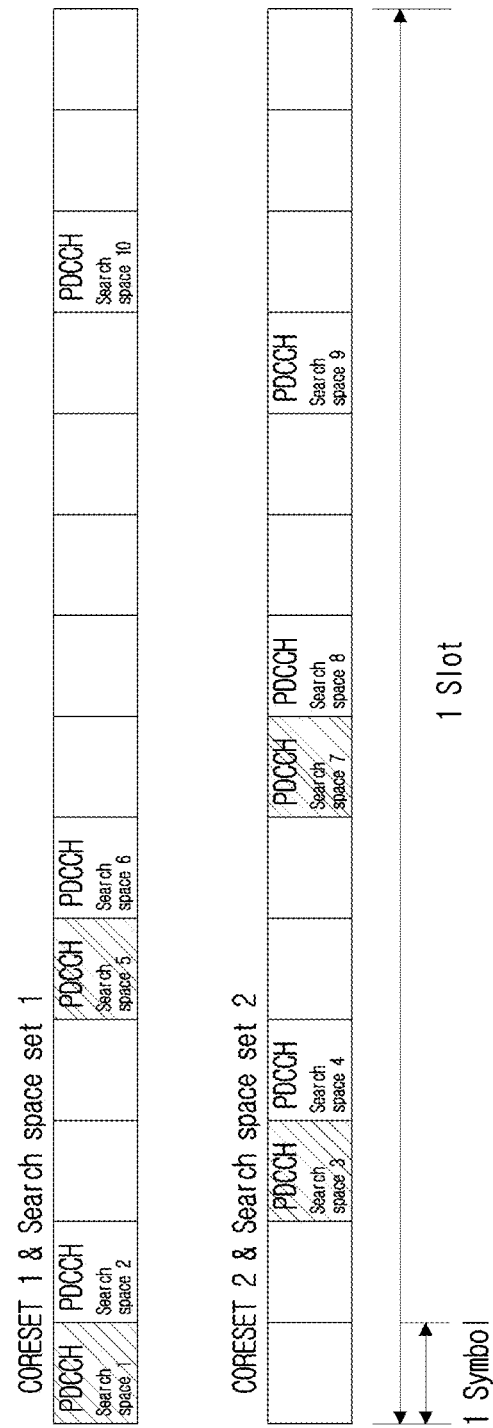
FIG. 13 illustrates a method of configuring a search space pair according to an embodiment of the present disclosure.

FIG. 13 illustrates a method of configuring a search space pair according to an embodiment of the present disclosure.

In FIG. 13, it is assumed that CORESET 1, SS set (search space set) 1 for TRP 1 is configured to a UE, and CORESET 2, SS set 2 for TRP 1 are configured to a UE as in FIG. 8. Accordingly, the description of FIG. 8 above for the CORESET and the SS set may be equivalently applied.

FIG. 13 illustrates a case in which the Embodiment 5 is applied when a window (i.e., N TU)=2 symbols.

In reference to FIG. 13, for SS 1, since SS 3 corresponding to SS set 2 exists in a window (i.e., OFDM symbols 1, 2, 3), SS 1 and SS 3 are paired. However, SS 2 is not paired because SS set 2 does not exist in a window (i.e., OFDM symbols 1, 2, 3) (i.e., since the next SS of SS 3 of SS set 2 does not exist in OFDM symbols 1, 2, 3). As described above, since SS 2 belongs to a window configured based on SS 1, a window is not configured based on SS 2.

For SS 5, since SS 7 corresponding to SS set 2 exists in a window (i.e., OFDM symbols 5, 6, 7), SS 5 and SS 7 are paired. However, SS 6 is not paired because SS set 2 does not exist in a window (i.e., OFDM symbols 5, 6, 7) (i.e., since the next SS of SS 7 of SS set 2 does not exist in OFDM symbols 5, 6, 7). As described above, since SS 6 belongs to a window configured based on SS 5, a window is not configured based on SS 6.

SS 10 is not paired because SS set 2 does not exist in a window (i.e., OFDM symbols 12, 13, 14).

Embodiment 6

A UE determines/identifies an SS (hereinafter referred to as SS p for convenience of description) that appears first in time sequence (and not yet belong to any window) among SSs of MTRP SS sets (i.e., SS set 1, 2). In addition, N TU (e.g., N symbol) may be configured/determined based on the first OFDM symbol (e.g., OFDM symbol k) of the corresponding SS p, hereinafter, this is referred to as a window (or time window) (e.g., OFDM symbols k, k+1, k+2, . . . , k+N). Since the N TU configuration method is the same as that of the Embodiment 1, a description thereof will be omitted.

The n-th SS of SS set 1 that appears in time order in a window may be paired with the n-th SS of SS set 2 that appears in time order in the same window. When MTRP SS sets include three or more SS sets (i.e., when three or more TRPs perform repeated PDCCH transmission), n-th SSs of each SS set may be paired in a window.

Meanwhile, additionally, the maximum value (=r) of the number of SS pairs in a window may be configured. Here, for example, a base station may determine r and signal r to a UE (e.g., higher layer signaling). Alternatively, a UE may report a value of r to a base station as UE capability.

Thereafter, a UE configures a window in the same manner as above for the next SS in time order that does not exist in any window in MTRP SS sets (i.e., SS sets 1 and 2), and repeat a process of searching for an SS pair.

A UE having determined an SS pair in the above manner may monitor repeatedly transmitted PDCCH candidates for detection of a DCI format in the corresponding SS pair in the linked/associated SS sets.

Figure 14:
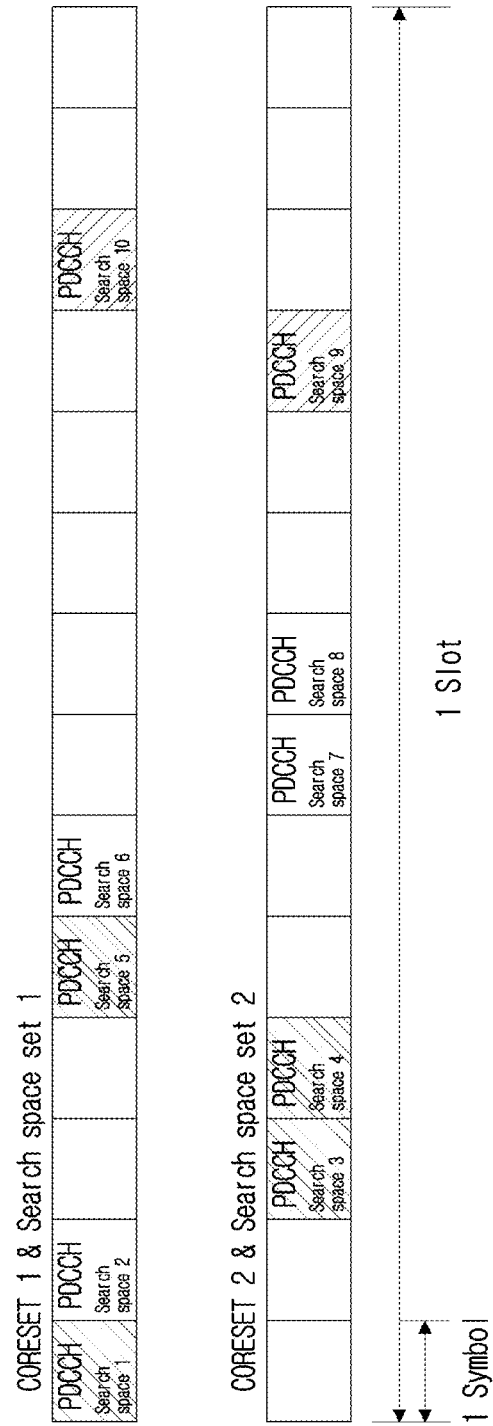
FIG. 14 illustrates a method of configuring a search space pair according to an embodiment of the present disclosure.

FIG. 14 illustrates a method of configuring a search space pair according to an embodiment of the present disclosure.

In FIG. 14, it is assumed that CORESET 1, SS set (search space set) 1 for TRP 1 is configured to a UE, and CORESET 2, SS set 2 for TRP 1 are configured to a UE as in FIG. 8. Accordingly, the description of FIG. 8 above for the CORESET and the SS set may be equivalently applied.

FIG. 14 illustrates a case in which the Embodiment 6 is applied when a window (i.e., N TU)=2 symbols.

In reference to FIG. 14, for SS 1, since SS 3 corresponding to SS set 2 exists in a window (i.e., OFDM symbols 1, 2, 3), SS 1 and SS 3 are paired. However, SS 2 is not paired because SS set 2 does not exist in a window (i.e., OFDM symbols 1, 2, 3) (i.e., since the next SS of SS 3 of SS set 2 does not exist in OFDM symbols 1, 2, 3). As described above, since SS 2 and SS 3 belong to a window configured based on SS 1, a window is not configured based on SS 2 and SS 3.

For SS 4, since SS 5 corresponding to SS set 1 exists in a window (i.e., OFDM symbols 4, 5, 6), SS 4 and SS 5 are paired. However, SS 6 is not paired because SS set 2 does not exist in a window (i.e., OFDM symbols 4, 5, 6) (i.e., since the next SS of SS 4 of SS set 2 does not exist in OFDM symbols 4, 5, 6). As described above, since SS 5 and SS 6 belong to a window configured based on SS 4, a window is not configured based on SS 5 and SS 6.

SS 7 and SS 8 are not paired because SS set 1 does not exist in a window (i.e., OFDM symbols 7, 8, 9). As described above, since SS 8 belongs to a window configured based on SS 7, a window is not configured based on SS 8.

For SS 9, since SS 10 corresponding to SS set 1 exists in a window (i.e., OFDM symbol 11, 12, 13), SS 9 and SS 10 are paired. As described above, since SS 10 belongs to a window configured based on SS 9, a window is not configured based on SS 10.

Meanwhile, the methods previously proposed in the present disclosure may be applied as a method for configuring/pairing a pair for a plurality of SSs in the same CC/BWP, however, the present disclosure is not limited thereto. The methods proposed in the present disclosure may also be applied as a method for configuring/pairing pairs for a plurality of SSs belonging to different CCs/BWPs. When pairing for a plurality of SSs belonging to different CCs/BWPs, if numerology (e.g., subcarrier spacing) or timing synchronization is different between CCs/BWPs, ambiguity about the start point and duration of the time window may occur. Accordingly, a reference SS may be defined or configured. For example, a symbol duration corresponding to a reference for a window size may be defined/configured based on a CC/BWP that has a smaller or larger subcarrier spacing among two CCs/BWPs. Alternatively, a window size may be defined as an absolute time such as N milliseconds (msec) rather than N symbols. Alternatively, the window start time may be defined/configured as one of the following ways: the time when the first SS corresponding to a reference for starting the window ends, the time when the first SS starts, or when the first SS ends and the next (DL) symbol/SS starts. Here, in the case of the last method (in case of different numerology between SSs or in case of asynchronous), the 'start time of the next (DL) symbol/SS' may be determined based on numerology and timing of a CORESET to which a SS that searches for a pair through a window belongs, not a SS which corresponds to a reference for starting a window.

In addition, the previously proposed methods in the Embodiments 1 to 6 have been described based on a time domain window for convenience of description, but the present disclosure is not limited thereto. That is, when a PDCCH repetition is performed in a frequency domain (i.e., a repeated PDCCH is transmitted by FDM), the methods of the above-described Embodiments 1 to 6 may be equivalently applied. In this case, in the above-described Embodiments, 'N symbol(s)' may be applied by substituting with 'N subcarrier(s)' or 'N resource block(s)'.

Embodiment 7

A method in which SSs transmitted by different TRPs (i.e., exist in different SS sets) in a window are paired has been described in the above-described Embodiments. By extending this, SSs used by any TRP (i.e., exist in different SS sets or the same SS set) in the window may be paired in the method of the above-described Embodiments. For example, in the examples of FIGS. 9 to 14 described above based on FIG. 8, SS sets 1 and 2 may be interpreted as one same SS set. Here, when paired between SSs of the same SS set, STRP repeatedly transmits a PDCCH.

Embodiment 8

In the above-described Embodiments, for convenience of description, the maximum number of repetitions of a PDCCH is assumed to be 2 (i.e., the same PDCCH is transmitted twice). However, technical features of the present disclosure are not limited thereto, and even when the maximum number of repetitions of a PDCCH is 2 or more, the above-described Embodiments may be extended and applied.

If the maximum number of repetitions is set to R (e.g., by higher layer signaling), the R SSs first appearing in time order (or frequency order) in a window in the above Embodiments may be paired (grouped). Thereafter, a process of pairing (or grouping) for the next first R SSs in time order (or frequency order) may be repeated. When R means the maximum number of repetitions (i.e., a PDCCH can be repeatedly transmitted up to R times), even if the number of remaining SSs in a window is equal to or less than R, pairing (or grouping) with only the remaining SSs may be performed. On the other hand, when R means the number of repetitions (i.e., a PDCCH should be repeatedly transmitted R times), if the number of remaining SSs in a window is equal to or less than R, pairing (or grouping) may not be performed with only the remaining SSs.

In addition to the method of pairing (or grouping) of the R SSs that appear first in time order (or frequency order)

within a window, the following method may be considered to maximize diversity gain using MTRP.

When pairing (or grouping) the R SSs within a window, pairing (or grouping) the R SSs that appear first in time order (or frequency order) is performed, however, a SS of SS set 1 corresponding to TRP 1 and a SS of SS set 2 corresponding to TRP 2 may be alternately selected. That is, when n TRPs (n is 3 or more) perform repeated PDCCH transmission, there are n SS sets corresponding to n TRPs, and pairing (or grouping) the R SSs that appear first in time order (or frequency order) is performed, however SSs of each SS set may be selected in rotation (cyclically). This will be described with reference to the drawings.

Figure 15:
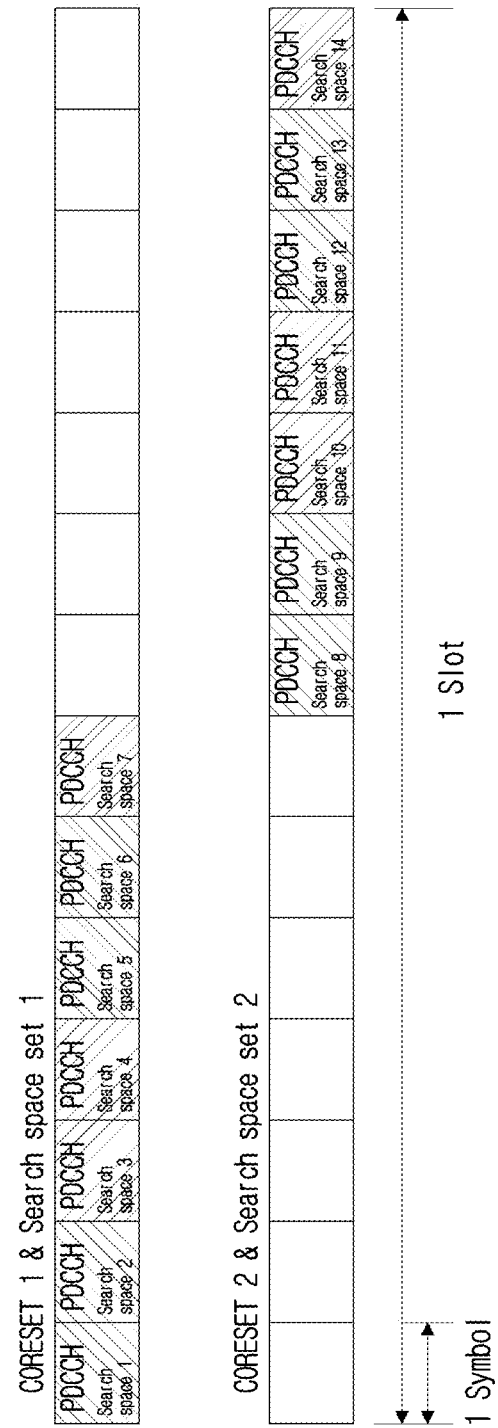
FIG. 15 illustrates a method of configuring a search space pair according to an embodiment of the present disclosure.

FIG. 15 illustrates a method of configuring a search space pair according to an embodiment of the present disclosure.

In FIG. 15, it is assumed that CORESET 1, SS set (search space set) 1 for TRP 1 is configured to a UE, and CORESET 2, SS set 2 for TRP 1 are configured to a UE as in FIG. 8, except for a pattern of SSs in 1 slot. Accordingly, the description of FIG. 8 above for the CORESET and the SS set excluding a SS pattern may be equivalently applied.

In reference to FIG. 15, it is assumed that SSs of SS set 1 are SSs 1, 2, 3, 4, 5, 6, 7 in time order (or frequency order) in a window (e.g., window=1 slot in FIG. 15), and SSs of SS set 2 are SSs 8, 9, 10, 11, 12, 13, 14 in time order (or frequency order) in the window. If R=4 is configured, (SS 1, SS 8, SS 2, SS 9) are paired (or grouped), and (SS 3, SS 10, SS 4, SS 11) are paired (or grouped), and (SS 5, SS 12, SS 6, SS 13) are paired (or grouped). When R means the maximum number of repetitions of a PDCCH, the remaining (SS 7, SS 14) are paired (or grouped), but when R means the number of repetitions of a PDCCH, (SS 7, SS 14) are not paired (grouped) because the repetition number is not satisfied.

If the above-described Embodiments 7 and 8 are applied to the Embodiment 4, the method of the Embodiments 7 and 8 may be applied to the SS represented (indicated) by 1 in a bitmap in each window (i.e., SS configured for repeated transmission).

Embodiment 9

According to the Embodiment 3 above, n-th SSs of each SS set may be paired in a given window for MTRP SS sets. For example, the i-th SS of SS set 1 and the i-th SS of SS set 2 may be paired. In this case, for each SS pair, an SS set including the temporally earliest SS among SSs belonging to an SS pair may be varied. That is, in some SS pair, an SS of SS set 1 may appear before an SS of SS set 2, and in another pair, conversely, an SS of SS set 1 may appear later than an SS of SS set 2. As a result, in some pair, TRP 1 transmits DCI first, and in another pair, TRP 2 may transmit DCI first. This will be described with reference to the drawings.

Figures 16A, 16B:
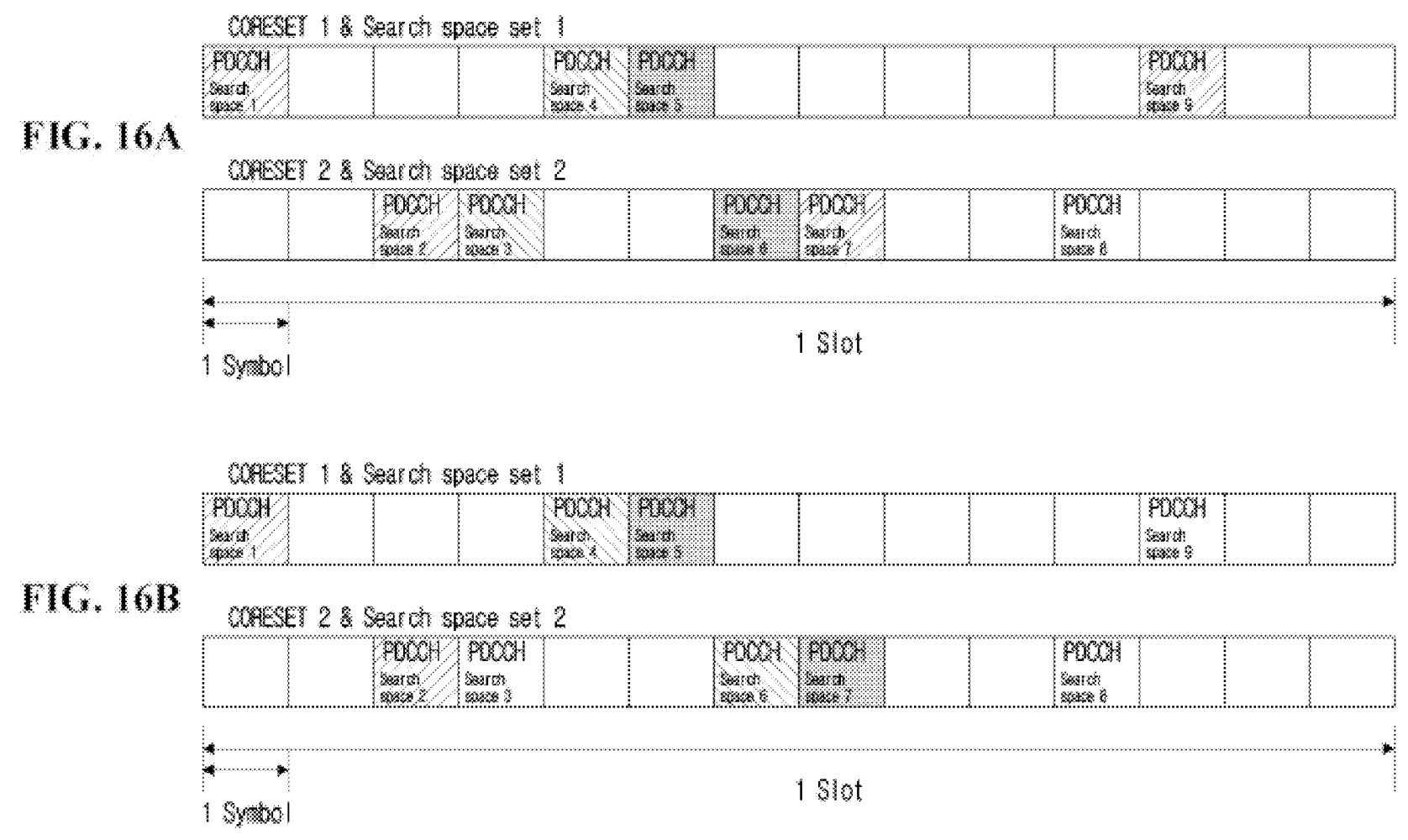

FIGS. 16A and 16B illustrate a method of configuring a search space pair according to an embodiment of the present disclosure.

In FIGS. 16A and 16B, it is assumed that CORESET 1, SS set (search space set) 1 for TRP 1 is configured to a UE, and CORESET 2, SS set 2 for TRP 1 are configured to a UE as in FIG. 8, except for a pattern of SSs in 1 slot. Accordingly, the description of FIG. 8 above for the CORESET and the SS set excluding a SS pattern may be equivalently applied.

FIG. 16A exemplifies a case in which the Embodiment 3 is applied when a window=1 slot.

In reference to FIG. 16A, a case in which 5 SS pairs corresponding to (SS 1, SS 2), (SS 3, SS 4), (SS 5, SS 6), (SS 7, SS 9) are configured is exemplified. As such, an order of SS sets (i.e., an order of SS sets to which an SS belongs) may vary for each SS pair. For example, SS set 1 appears first in the first SS pair (SS 1, SS 2), but SS set 2 appears first in the second SS pair (SS 3, SS 4).

In general, if one TRP has a stronger channel than the other TRP, it may be helpful to lower the latency to allow a UE to succeed DCI as soon as possible by allowing the TRP with a strong channel to transmit DCI first. Therefore, it is proposed as follows so that a specific SS set or a specific CORESET may appear first in time in an SS pair.

The i-th SS of a specific SS set (e.g., SS set 1) may be paired with the first (i.e., earliest) SS, that appear later than the SS, among SSs of another SS set (e.g., SS set 2) in the same window.

Here, the specific SS set may be determined based on a specific SS set ID (e.g., the lowest SS set ID or the highest SS set ID) or a CORESET ID linked/associated with an SS set (e.g., the lowest CORESET ID or the highest CORESET ID), or a base station may indicate it (SS set ID or CORESET ID).

In addition, a window may be configured in every 1 slot (in the case of intra-slot PDCCH repetition), in every N slots (in the case of inter-slot PDCCH repetition), or in every 7 symbols.

FIG. 16B exemplifies a case in which the Embodiment 9 is applied when window=1 slot. For example, this is an example when an SS of SS set 1 is configured to appear first in time in an SS pair.

In reference to FIG. 16B, SS 1 is paired with SS 2 that appears first after SS 1 in a window (i.e., 1 slot) among SSs corresponding to SS set 2.

SS 4 is paired with SS 6 that appears first after SS 4 in a window (i.e., 1 slot) among SSs corresponding to SS set 2.

SS 5 is paired with SS 7 that appears first after SS 5 in a window (i.e., 1 slot) among SSs corresponding to SS set 2.

Embodiment 10

In the Embodiment 9, a plurality of SSs belonging to a specific SS set (e.g., SS set 1) may be linked (i.e., pair) with one SS belonging to another SS set (e.g., SS set 2). This will be described with reference to the drawings below.

Figures 17A, 17B:
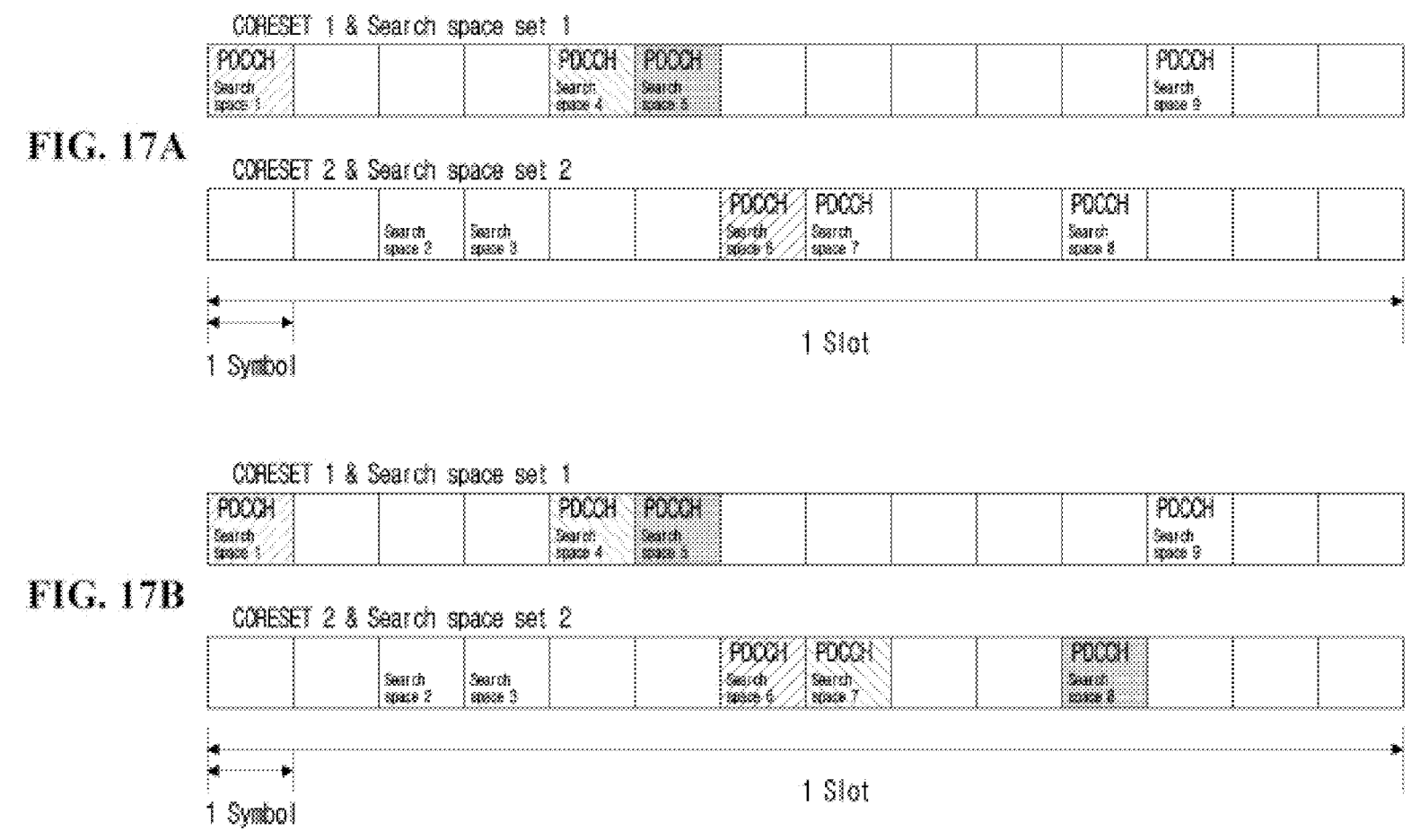

FIGS. 17A and 17B illustrate a method of configuring a search space pair according to an embodiment of the present disclosure.

In FIGS. 17A and 17B, it is assumed that CORESET 1, SS set (search space set) 1 for TRP 1 is configured to a UE, and CORESET 2, SS set 2 for TRP 1 are configured to a UE as in FIG. 8, except for a pattern of SSs in 1 slot. Accordingly, the description of FIG. 8 above for the CORESET and the SS set excluding a SS pattern may be equivalently applied.

FIG. 17A exemplifies a case in which the Embodiment 9 is applied when a window=1 slot.

Referring to FIG. 17A, SSs 1, 4, and 5 may all be linked/paired with SS 6. In this case, the following problems occur. When the channel strength from CORESET 1 becomes weak due to an object such as a building (i.e., blockage effect), and the channel strength from CORESET 2 is strong, a UE can succeed in decoding a PDCCH in all of an SS pair (SS 1, SS 6), an SS pair (SS 4, SS6), and an SS pair (SS 5, SS6). This is because even if decoding fails from SSs 1, 4, and 5 with weak channels, decoding can be succeeded from SS 6 with strong channels. In this case, a UE cannot determine whether the SS pair repeatedly transmitted by a base station is an SS pair (SS 1, SS 6), an SS pair (SS 4, SS 6), or an SS pair (SS 5, SS 6). As a result, many parameters determined based on the SS pair cannot be determined. For example, a downlink assignment index (DAI) value may be configured for HARQ feedback in DL grant DCI, and the DAI value is determined based on the first SS of the SS pair. Therefore, in the above situation, a UE cannot correctly configure the DAI value because it is ambiguous whether the first SS of the SS pair is SS 1, 4, or 6.

In order to prevent the above problem, the following method is proposed with some modifications in the Embodiment 9.

The i-th SS of a specific SS set (e.g., SS set 1) may be paired with the first (i.e., earliest) SS that appears later in time than the SS and is not yet paired with the specific SS set (e.g., SS set 1) among SSs of other SS set (e.g., SS set 2) in the same window. That is, remaining SSs may be considered as a pair except for an SS for which a pair has already been configured in an SS set different from the specific SS set.

When a UE and a base station perform the pairing, the UE and the base station attempt pairing from the first SS of a specific SS set (e.g., SS set 1), and then attempt pairing the second SS and the third SS of the specific SS set (e.g., SS set 1) in time order.

Here, the specific SS set may be determined based on a specific SS set ID (e.g., the lowest SS set ID or the highest SS set ID) or a CORESET ID linked/associated with an SS set (e.g., the lowest CORESET ID or the highest CORESET ID), or a base station may indicate it (SS set ID or CORESET ID).

FIG. 17B exemplifies a case in which the Embodiment 10 is applied when a window=1 slot.

SS 1 is paired with SS 6, which appears after SS 1 in a window (i.e., 1 slot) and is the first SS that has not yet been paired, among SSs corresponding to SS set 2.

SS 4 is paired with SS 7, which appears after SS 4 in a window (i.e., 1 slot) and is the first SS that has not yet been paired, among SSs corresponding to SS set 2.

SS 5 is paired with SS 8, which appears after SS 5 in a window (i.e., 1 slot) and is the first SS that has not yet been paired, among SSs corresponding to SS set 2.

Embodiment 11

In the current Rel 17 NR standard, in order to more effectively manage a PDCCH beam (i.e., QCL RS information configured in a TCI state of a CORESET), a dynamic beam update using DCI is scheduled to be supported. Conventionally, only beam information of a PDSCH is indicated as a TCI state is indicated through a TCI field of DCI, however, it is under discussion to extend this and apply the indicated TCI state to a beam of a PDCCH. For example, a UE transmits A/N (ACK/NACK) information for a PDSCH scheduled through DCI, and the UE may receive a PDCCH by updating a beam of the PDCCH, which is received after a specific time after the A/N information transmission, to the TCI state indicated by the DCI (i.e., the DCI scheduling the PDSCH). Here, the PDCCH in which the beam is updated in the TCI state indicated by DCI may correspond to all CORESETs (i.e., Case 1) or some CORESETs corresponding to a subset (i.e., Case 2) configured to a UE in a corresponding serving cell and a corresponding active BWP.

When a beam of a CORESET is dynamically updated in this way, the SS set mapped to the CORESET corresponds to an SS set configured to be linked/associated with another SS set (i.e., by higher layer signaling (e.g., RRC signaling)) for MTRP PDCCH repetition. In this case, if the beam is updated with a beam that is not suitable for MTRP PDCCH repetition, since the MTRP PDCCH repetition using the linked/associated SS sets is no longer valid, an operation to cancel the corresponding linkage/association is required. However, since linkage/association configuration between SS sets may be semi-statically configured with higher layer signaling (e.g., RRC signaling), a method of dynamically configuring linkage/association between these SS sets is proposed as follows.

First, when a beam of a CORESET is dynamically configured (i.e., updated) as described above, if the SS set mapped to the CORESET is linked/associated with another SS set, the corresponding linkage/association may be canceled (i.e., disconnected). Here, in the Case 1 in which beams of all CORESETs configured to a UE in a corresponding serving cell and a corresponding active BWP are dynamically configured (i.e., updated), since all CORESET beams have been updated, it is desirable to cancel the linkage/association of all SS sets. On the other hand, in the Case 2 in which beams of some CORESET in a corresponding serving cell and a corresponding active BWP is dynamically configured (i.e., updated), it is desirable to cancel only the link/connection of the SS set mapped to the corresponding some CORESET.

Alternatively, a base station may inform a UE of a SS set group for canceling the linkage/association when a PDCCH beam is dynamically configured. Alternatively, a UE and a base station may determine a group for canceling the link/association through a specific rule. In this case, only the link/connection of the SS set belonging to the corresponding group may be canceled. This may apply to the Case 1 and/or the Case 2.

Alternatively, similarly, a base station may inform a UE of a CORESET group for canceling the linkage/association when a PDCCH beam is dynamically configured. Alternatively, a UE and a base station may determine a group for canceling the link/association through a specific rule. In this case, only the link/connection of the SS set mapped to the CORESET belonging to the corresponding group may be canceled. This may apply to the Case 1 and/or the Case 2.

Alternatively, a TCI state for maintaining the linkage/association and a TCI state for canceling the linkage/association among TCI states may be grouped, respectively, and a base station may inform a UE of each group information. Alternatively, a UE and a base station may determine a group of the TCI state for maintaining the linkage/association and a group of the TCI state for canceling the linkage/association through a specific rule. In this case, when a CORESET beam is updated to the TCI state that maintains the linkage/connection, the linkage/connection of a SS set mapped to the CORESET may be maintained. On the other hand, if a CORESET beam is updated to the TCI state for canceling the linkage/association, the linkage/association of a SS set mapped to the CORESET may be canceled.

Alternatively, a CORESET of an SS set in which the linkage/connection is configured may not support a dynamic beam configuration. That is, by limiting the dynamic beam configuration to be supported only by a CORESET of an SS set in which linkage/association is not configured, a problem related to the linkage/association between SS sets can be prevented from occurring.

In addition, a base station may determine whether to apply one or more of the proposed operations, and may configure a UE through signaling (e.g., DCI/MAC-CE/RRC signaling). In this case, a UE may or may not perform the corresponding operation according to the configuration of a base station.

In the present disclosure, when a PDCCH is transmitted a plurality of times, although the proposed methods have been described with examples that the same PDCCH (i.e., the same DCI) is repeatedly transmitted, these are only examples for convenience of description. That is, even when the same PDCCH (i.e., the same DCI) is divided and transmitted over a plurality of times, the above-described proposed methods can be extended and applied.

In addition, the embodiments described in the present disclosure (e.g., Embodiments 1 to 11, etc.) may be operated independently, or any one or more embodiments may be applied in combination with each other.

Figure 18:
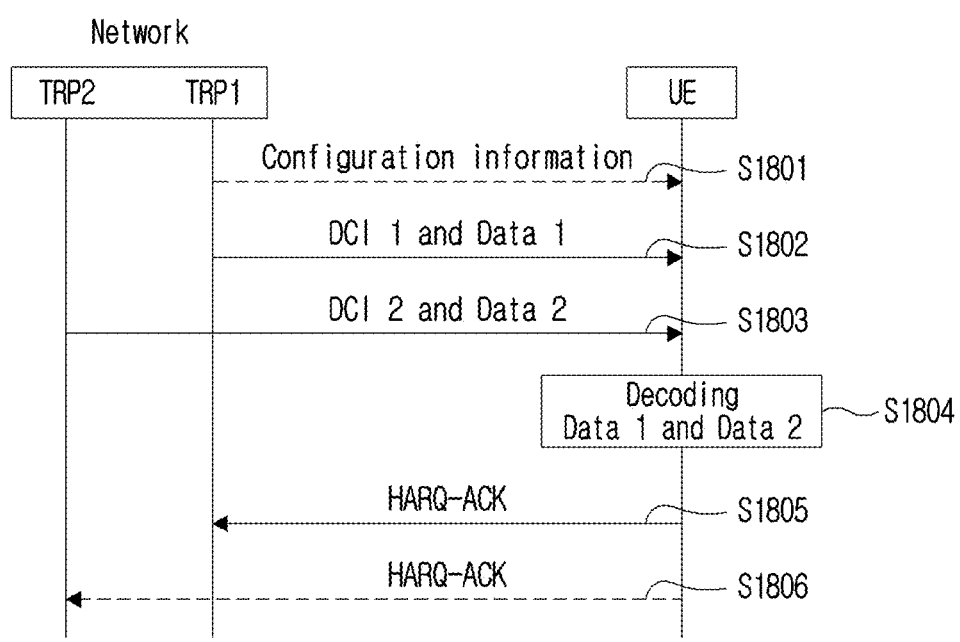
FIG. 18 illustrates a signaling procedure between a network and a UE for a method for transmitting and receiving a PDCCH according to an embodiment of the present disclosure.

FIG. 18 illustrates a signaling procedure between a network and a UE for a method for transmitting and receiving a PDCCH according to an embodiment of the present disclosure.

FIG. 18 to be described later exemplifies a signaling procedure between a network (e.g., TRP 1, TRP 2) and a terminal (i.e., UE) in a situation of multiple TRP (i.e., M-TRP, or multiple cells, hereinafter all TRP may be substituted with cells) to which the methods (e.g., Embodiments 1 to 11, etc.) proposed in the present disclosure may be applied.

Figure 21:
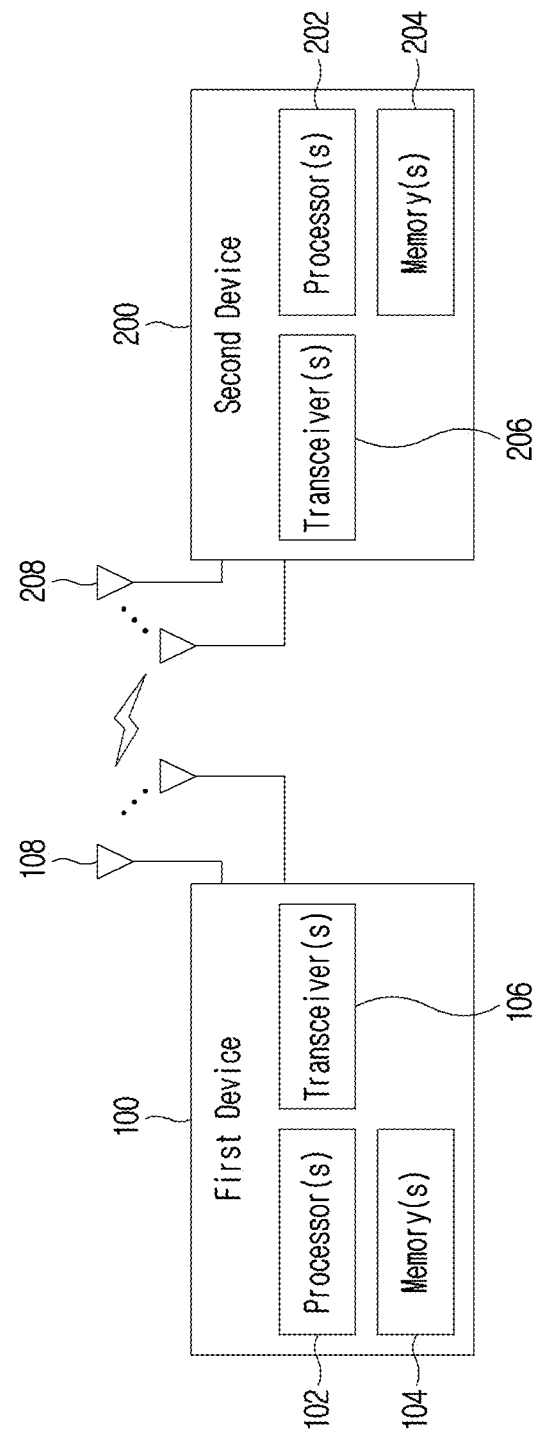
FIG. 21 illustrates a block diagram of a wireless communication device according to an embodiment of the present disclosure.

Here, UE/Network may be an example and may be applied by being substituted with a variety of devices as described in FIG. 21. FIG. 18 is only for convenience of description, but it is not intended to limit a scope of the present disclosure. In addition, some step(s) shown in FIG. 18 may be omitted according to a situation and/or a configuration, etc.

Referring to FIG. 18, signaling between two TRPs and a UE is considered for convenience of description, but of course, the signaling method may be extended and applied to signaling between multiple TRPs and multiple UEs. In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

In addition, as described above, a "TRP" may be applied by being substituted with a panel, an antenna array, a cell (e.g., macro cell/small cell/pico cell, etc.), TP (transmission point), base station (base station, gNB, etc.), etc. As described above, a TRP may be classified according to information (e.g., index, identifier (ID)) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, a base station may mean a generic term for an object that transmits and receives data with a terminal. For example, the base station may include one or more TPs (Transmission Points), one or more TRPs (Transmission and Reception Points), etc. In addition, a TP and/or a TRP may include a panel of a base station, a transmission and reception unit, etc.

Specifically, FIG. 18 exemplifies signaling when a UE receives multiple DCI (e.g., when each TRP transmits DCI to a UE) in an M-TRP (or cell, hereinafter all TRPs may be substituted with cells, or it may be assumed to be M-TRP even when a plurality of CORESETs are configured from one TRP) situation.

Referring to FIG. 18, a UE may receive configuration information for multiple TRP-based transmission/reception through/using TRP 1 (and/or TRP 2) from a Network (S1801).

The configuration information may include information related to a configuration of a network (i.e., TRP configuration), resource information (resource allocation) related to multiple TRP-based transmission and reception, etc. Here, the configuration information may be transmitted through higher layer signaling (e.g., RRC signaling, MAC-CE, etc.). In addition, when the configuration information is predefined or preconfigured, the corresponding step may be omitted. For example, the configuration information may include, as described in the above-described proposed methods (e.g., Embodiments 1 to 11, etc.), a CORESET related configuration/CCE configuration information/search space related information/control channel (e.g., PDCCH) repetitive transmission related information (e.g., whether repeated transmission/the number of repeated transmission, etc.)/ control channel (e.g., PDCCH) related resource collision/ overbooking related information (e.g., the number of PDCCH candidates to be dropped upon collision/priority related information, etc.), etc.

For example, the configuration information, as described in the above-described methods (e.g., Embodiments 1 to 11, etc.), may include configuration information (e.g., SearchSpace) related to each search space (set) of one or more search space sets configured for a UE. The configuration information related to search space (set) may provide with information on a search space index (e.g., searchSpaceId), CORESET information (eg, controlResourceSetId) associated with the corresponding search space set, a PDCCH monitoring period in units of slots and a PDCCH monitoring offset (e.g., monitoringSlotPeriodicityAndOffset), an in-slot PDCCH monitoring pattern indicating the first symbol(s) of a CORESET in a slot for PDCCH monitoring (monitoringSymbolsWithinSlot), the number (duration) of consecutive slots in which the corresponding search space set continues, etc.

In addition, the configuration information may include linkage/association information between search space sets in which monitoring occasions (i.e., search spaces) for transmission (or monitoring) of a PDCCH that is repeatedly (or dividedly) transmitted for the same DCI (i.e., carrying the same DCI) are included. In addition, the configuration information may include information on monitoring occasions (i.e., search spaces) available for transmission (or monitoring) of a PDCCH that is repeatedly (or dividedly) transmitted for the same DCI (i.e., carrying the same DCI).

In addition, the configuration information may further include information (e.g., information on a size of a window, a search space set corresponding to a reference for determining a window, etc.) for determining a time duration (i.e., window) for determining a monitoring occasion (i.e., search space) used for PDCCH repetition (or division) transmission.

In addition, the configuration information may further include information on the maximum number of repetitions (or divisions) of a PDCCH for the same DCI (i.e., carrying the same DCI) in a window.

Alternatively, as described above, a window may be defined as a predetermined time duration (without signaling of a base station), for example, one slot or half slot.

In addition, for example, the configuration information is, as described in the above-described methods (e.g., Embodiments 1 to 11, etc.), may include CORESET-related configuration information (e.g., ControlResourceSet IE). The CORESET-related configuration information may include a CORESET-related ID (e.g., controlResourceSetID), an CORESET pool index for a CORESET (e.g., CORESET-PoolIndex), a time/frequency resource configuration of a CORESET, TCI information related to a CORESET, etc. For example, the configuration information may include repeated transmission scheme (e.g., Repetitionscheme) information. In addition, a quasi co-location (QCL) reference reference signal (RS) for one or more CORESETs may be configured by the TCI information. Specifically, the TCI information may include QCL type information and/or information on a reference RS having a QCL relationship with a PDCCH DMRS port in the CORESET (or a serving cell in which the CORESET is configured).

A UE may receive DCI 1 and data 1 scheduled by the corresponding DCI 1 through/using TRP 1 from a Network (S1802). In addition, a UE may receive DCI 2 and data 2 scheduled by the corresponding DCI 2 through/using TRP 2 from a network (S1803).

DCI (e.g., DCI 1, DCI 2) and Data (e.g., Data 1, Data 2) may be respectively transmitted through a control channel (e.g., PDCCH, etc.) and a data channel (e.g., PDSCH, etc.). For example, the control channel (e.g., PDCCH) may be repeatedly transmitted (i.e., the same DCI is transmitted), or the same control channel may be divided and transmitted. In addition, steps S1802 and S1803 may be performed simultaneously, or one may be performed earlier than the other.

In addition, although in FIG. 18, a case of transmitting data 1 and data 2 respectively in TRP 1 and TRP 2 is exemplified, the present disclosure is not limited thereto, and conversely, when a UE transmits data 1 and data 2 to TRP 1 and TRP 2, the proposed methods of the present disclosure may be applied. In addition, when only one TRP transmits data to a UE or a UE transmits data to any one TRP on the contrary, the proposed methods of the present disclosure may also be applied.

For example, the DCI 1 and the DCI 2 may include (indication) information on a TCI state, resource allocation information on a DMRS and/or data (i.e., space/frequency/time resources), etc.

As described above, TRP 1 and/or TRP 2 may transmit by repeating/dividing the same DCI. For example, PDCCH candidates for each TRP through which the DCI 1 and the DCI 2 are transmitted may correspond to different TCI states (or different QCL type D reference RSs). In other words, a control channel (e.g., PDCCH) through which the DCI 1 and the DCI 2 may be transmitted may be repeatedly transmitted based on a TDM/FDM/SDM scheme, or the same control channel may be divided and transmitted.

For example, the DCI 1 and the DCI 2 may be transmitted repeatedly (or dividedly) in a plurality of monitoring occasions (or search spaces) belonging to different search space sets described in the above-described methods (e.g., Embodiments 1 to 11, etc.). For example, in a case of repeated transmission of a PDCCH, the DCI 1 and the DCI 2 may correspond to the same DCI. Here, the same DCI may mean a DCI format including the same information. In a case of divided transmission of a PDCCH, the DCI 1 and the DCI 2 may be combined to form one DCI.

Here, different search space sets used for the repetition (or division) of the PDCCH may be associated with different CORESETs, respectively, and different QCL information for receiving the PDCCH may be configured for each CORESET. Alternatively, different search space sets used for the repetition (or division) of the PDCCH may be associated with the same single CORESET. In this case, in the single CORESET, QCL information may be configured as much as the number of search space sets associated for the PDCCH reception, or one QCL information may be configured irrespective of the number of search space sets (that is, STRP transmission).

A UE may receive a PDCCH (carrying the same DCI) for the same DCI in a first monitoring occasion (i.e., search space) of a first search space set and a second monitoring occasion (i.e., search space) of a second search space set. That is, a UE may monitor PDCCH candidates to detect the same DCI in a first monitoring occasion (i.e., search space) of a first search space set and a second monitoring occasion (i.e., search space) of a second search space set.

Here, a pair of the first monitoring occasion (i.e., search space) and the second monitoring occasion (i.e., search space) may be determined according to the methods described in the above-described methods (e.g., Embodiments 1 to 11, etc.).

For example, according to the Embodiment 3, the first monitoring occasion and the second monitoring occasion may correspond to the n-th (n is a natural number) monitoring occasion in a predetermined time duration (i.e., window) among one or more monitoring occasions of the first search space set and the second search space set, respectively. Here, for example, according to the Embodiment 4, the first monitoring occasion and the second monitoring occasion may be determined from one or more available monitoring occasions of the first search space set and the second search space set, respectively. Here, a predetermined time duration (i.e., window) may be fixed and predetermined as one slot or half slot. Alternatively, for example, according to the Embodiment 5, a time duration (i.e., window) may be determined based on a monitoring occasion that is the earliest and does not belong to any window among one or more monitoring occasions of the first search space set and the second search space set. Alternatively, for example, according to the Embodiment 6, a time duration (i.e., window) may be determined based on a monitoring occasion that is the earliest and does not belong to any window among one or more monitoring occasions of a specific search space set among the first search space set and the second search space set.

In addition, when a TCI state of a CORESET associated with any one of the first search space set and the second search space set is updated (e.g., update indication by DCI), a linkage between the first search space set and the second search space set may be released. That is, repeated (or divided) transmission of a M-TRP-based PDCCH may be released.

A UE may decode Data 1 and Data 2 received through/using TRP 1 (and/or TRP 2) from a Network (S1804). For example, a UE may perform channel estimation and/or decoding of data by applying an aggregation level/TCI state mapping, etc. according to a definition (e.g., defined based on a CORESET/SS set) of a candidate of a control channel (e.g., PDCCH).

A UE may transmit HARQ-ACK information (e.g., ACK information, NACK information, etc.) for Data 1 and/or Data 2 to a Network through/using TRP 1 and/or TRP 2 (S1805, S1806). In this case, HARQ-ACK information for Data 1 and Data 2 may be combined into one. In addition, a UE may be configured to transmit only HARQ-ACK information to a representative TRP (e.g., TRP 1), and transmission of HARQ-ACK information to another TRP (e.g., TRP 2) may be omitted.

Figure 19:
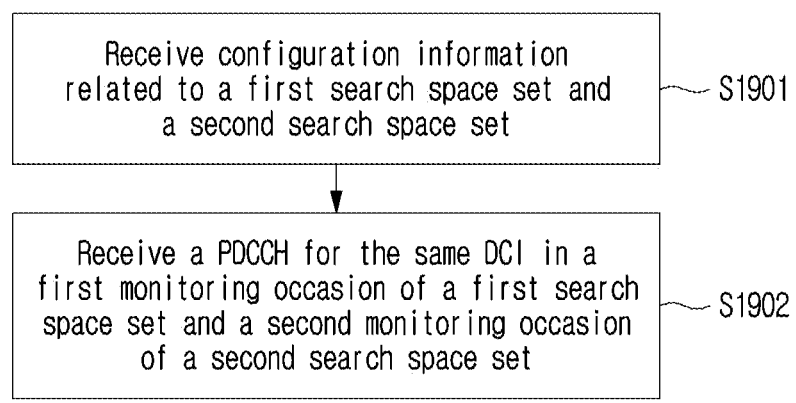
FIG. 19 is a diagram illustrating an operation of a terminal in a method for receiving a PDCCH according to an embodiment of the present disclosure.

FIG. 19 is a diagram illustrating an operation of a terminal in a method for receiving a PDCCH according to an embodiment of the present disclosure.

FIG. 19 exemplifies an operation of a terminal based on the above-described Embodiments 1 to 11. FIG. 19 is only for convenience of description, but it is not intended to limit a scope of the present disclosure. Some step(s) shown in FIG. 19 may be omitted according to a situation and/or a configuration, etc. In addition, a terminal in FIG. 19 is only one example, and may be implemented as a device illustrated in FIG. 21. For example, a processor (102/202) of FIG. 21 may control to transmit and receive channel/signal/data/information, etc. by using a transceiver (106/206), and control to store transmitted or received channel/signal/data/information in a memory (104/204).

In addition, an operation of FIG. 19 may be processed by one or more processors (102, 202) of FIG. 21. In addition, an operation of FIG. 19 may be stored in a memory (e.g., one or more memories (104, 204) of FIG. 21) in a form of an instruction/program (e.g., instruction, executable code) for driving at least one processor (e.g., 102, 202) of FIG. 21.

A terminal receives configuration information related to a first search space set and a second search space set for a PDCCH (i.e., for monitoring a PDCCH (candidate)) from a base station (S1901).

Here, a PDCCH may be repeatedly transmitted (i.e., the same DCI is transmitted) from multiple TRPs, as described in the above-described methods (e.g., Embodiments 1 to 11, etc.).

The configuration information, as described in the above-described methods (e.g., Embodiments 1 to 11, etc.), may include configuration information (e.g., SearchSpace) related to each search space (set) of one or more search space sets configured for a UE. The configuration information related to search space (set) may provide with information on a search space index (e.g., searchSpaceId), CORESET information (eg, controlResourceSetId) associated with the corresponding search space set, a PDCCH monitoring period in units of slots and a PDCCH monitoring offset (e.g., monitoringSlotPeriodicityAndOffset), an in-slot PDCCH monitoring pattern indicating the first symbol(s) of a CORESET in a slot for PDCCH monitoring (monitoringSymbolsWithinSlot), the number (duration) of consecutive slots in which the corresponding search space set continues, etc.

In addition, the configuration information may include linkage/association information between search space sets in which monitoring occasions (i.e., search spaces) for transmission (or monitoring) of a PDCCH that is repeatedly (or dividedly) transmitted for the same DCI (i.e., carrying the same DCI) are included. In addition, the configuration information may include information on monitoring occasions (i.e., search spaces) available for transmission (or monitoring) of a PDCCH that is repeatedly (or dividedly) transmitted for the same DCI (i.e., carrying the same DCI).

In addition, the configuration information may further include information (e.g., information on a size of a window, a search space set corresponding to a reference for determining a window, etc.) for determining a time duration (i.e., window) for determining a monitoring occasion (i.e., search space) used for PDCCH repetition (or division) transmission. Here, the time duration may be determined in units of N (N is a natural number) symbols or slots.

In addition, the configuration information may further include information on the maximum number of repetitions (or divisions) of a PDCCH for the same DCI (i.e., carrying the same DCI) in a window.

Alternatively, as described above, a window may be defined as a predetermined time duration (without signaling of a base station), for example, one slot or half slot.

A terminal receives a PDCCH for the same DCI (carrying the same DCI) in a first monitoring occasion of a first search space set and a second monitoring occasion of a second search space set (S1902).

A PDCCH for the same DCI may be transmitted from multiple TRPs. Here, the same DCI may mean a DCI format including the same information. And, different search space sets may correspond to each TRP, a PDCCH for the same DCI (carrying the same DCI) may be repeatedly transmitted at a plurality of monitoring occasions (or search spaces) of different search space sets.

Here, different search space sets used for the repetition (or division) of the PDCCH may be associated with different CORESETs, respectively, and different QCL information for receiving the PDCCH may be configured for each CORESET. Alternatively, different search space sets used for the repetition (or division) of the PDCCH may be associated with the same single CORESET. In this case, in the single CORESET, QCL information may be configured as much as the number of search space sets associated for the PDCCH reception, or one QCL information may be configured irrespective of the number of search space sets (that is, STRP transmission).

A terminal may receive a PDCCH (carrying the same DCI) for the same DCI in a first monitoring occasion (i.e., search space) of a first search space set and a second monitoring occasion (i.e., search space) of a second search space set. That is, a UE may monitor PDCCH candidates to detect the same DCI in a first monitoring occasion (i.e., search space) of a first search space set and a second monitoring occasion (i.e., search space) of a second search space set.

Here, a pair of the first monitoring occasion (i.e., search space) and the second monitoring occasion (i.e., search space) may be determined according to the methods described in the above-described methods (e.g., Embodiments 1 to 11, etc.).

For example, according to the Embodiment 3, the first monitoring occasion and the second monitoring occasion may correspond to the n-th (n is a natural number) monitoring occasion in a predetermined time duration (i.e., window) among one or more monitoring occasions of the first search space set and the second search space set, respectively. Here, for example, according to the Embodiment 4, the first monitoring occasion and the second monitoring occasion may be determined from one or more available monitoring occasions of the first search space set and the second search space set, respectively. Here, a predetermined time duration (i.e., window) may be fixed and predetermined as one slot or half slot. Alternatively, for example, according to the Embodiment 5, a time duration (i.e., window) may be determined based on a monitoring occasion that is the earliest and does not belong to any window among one or more monitoring occasions of the first search space set and the second search space set. Alternatively, for example, according to the Embodiment 6, a time duration (i.e., window) may be determined based on a monitoring occasion that is the earliest and does not belong to any window among one or more monitoring occasions of a specific search space set among the first search space set and the second search space set.

In addition, when a TCI state of a CORESET associated with any one of the first search space set and the second search space set is updated (e.g., update indication by DCI), a linkage between the first search space set and the second search space set may be released. That is, repeated (or divided) transmission of a M-TRP-based PDCCH may be released.

Thereafter, a terminal may perform data transmission/reception with a base station based on received PDCCH (i.e., DCI).

Figure 20:
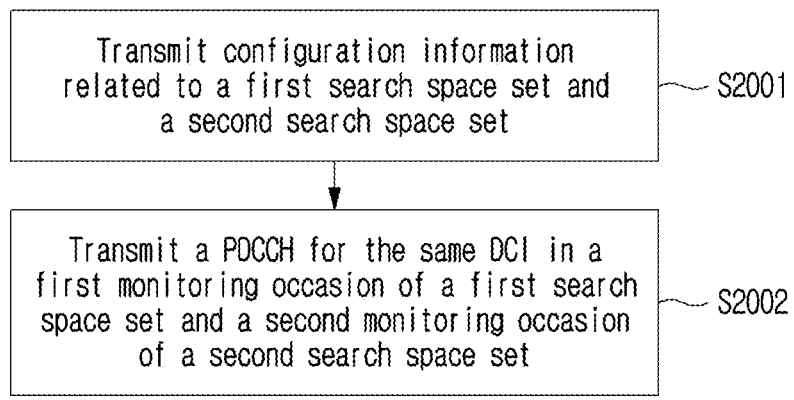
FIG. 20 is a diagram illustrating an operation of a base station in a method for transmitting a PDCCH according to an embodiment of the present disclosure.

FIG. 20 is a diagram illustrating an operation of a base station in a method for transmitting a PDCCH according to an embodiment of the present disclosure.

FIG. 20 exemplifies an operation of a base station based on the above-described Embodiments 1 to 11. FIG. 20 is only for convenience of description, but it is not intended to limit a scope of the present disclosure. Some step(s) shown in FIG. 20 may be omitted according to a situation and/or a configuration, etc. In addition, a base station in FIG. 20 is only one example, and may be implemented as a device illustrated in FIG. 21. For example, a processor (102/202) of FIG. 21 may control to transmit and receive channel/signal/data/information, etc. by using a transceiver (106/206), and control to store transmitted or received channel/signal/data/information in a memory (104/204).

In addition, an operation of FIG. 20 may be processed by one or more processors (102, 202) of FIG. 21. In addition, an operation of FIG. 20 may be stored in a memory (e.g., one or more memories (104, 204) of FIG. 21) in a form of an instruction/program (e.g., instruction, executable code) for driving at least one processor (e.g., 102, 202) of FIG. 21.

A base station transmits configuration information related to a first search space set and a second search space set for a PDCCH (i.e., for monitoring a PDCCH (candidate)) to a terminal (S2001).

Here, a PDCCH may be repeatedly transmitted (i.e., the same DCI is transmitted) from multiple TRPs, as described in the above-described methods (e.g., Embodiments 1 to 11, etc.).

If multiple TRPs correspond to different base stations respectively, a PDCCH may be transmitted from different base stations as described in the above-described methods (e.g., Embodiments 1 to 11, etc.). On the other hand, if multiple TRPs correspond to one base station (e.g., multiple TRPs correspond to different cells in a base station, respectively), a PDCCH may be transmitted from different TRPs as described in the above-described methods (e.g., Embodiments 1 to 11, etc.), but may be transmitted from one base station.

The configuration information, as described in the above-described methods (e.g., Embodiments 1 to 11, etc.), may include configuration information (e.g., SearchSpace) related to each search space (set) of one or more search space sets configured for a UE. The configuration information related to search space (set) may provide with information on a search space index (e.g., searchSpaceId), CORESET information (eg, controlResourceSetId) associated with the corresponding search space set, a PDCCH monitoring period in units of slots and a PDCCH monitoring offset (e.g., monitoringSlotPeriodicityAndOffset), an in-slot PDCCH monitoring pattern indicating the first symbol(s) of a CORESET in a slot for PDCCH monitoring (monitoringSymbolsWithinSlot), the number (duration) of consecutive slots in which the corresponding search space set continues, etc.

In addition, the configuration information may include linkage/association information between search space sets in which monitoring occasions (i.e., search spaces) for transmission (or monitoring) of a PDCCH that is repeatedly (or dividedly) transmitted for the same DCI (i.e., carrying the same DCI) are included. In addition, the configuration information may include information on monitoring occasions (i.e., search spaces) available for transmission (or monitoring) of a PDCCH that is repeatedly (or dividedly) transmitted for the same DCI (i.e., carrying the same DCI).

In addition, the configuration information may further include information (e.g., information on a size of a window, a search space set corresponding to a reference for determining a window, etc.) for determining a time duration (i.e., window) for determining a monitoring occasion (i.e., search space) used for PDCCH repetition (or division) transmission. Here, the time duration may be determined in units of N (N is a natural number) symbols or slots.

In addition, the configuration information may further include information on the maximum number of repetitions (or divisions) of a PDCCH for the same DCI (i.e., carrying the same DCI) in a window.

Alternatively, as described above, a window may be defined as a predetermined time duration (without signaling of a base station), for example, one slot or half slot.

A base station transmits a PDCCH for the same DCI (carrying the same DCI) in a first monitoring occasion of a first search space set and a second monitoring occasion of a second search space set (S2002).

If multiple TRPs correspond to different base stations respectively, a PDCCH may be transmitted from different base stations as described in the above-described methods (e.g., Embodiments 1 to 11, etc.). That is, one base station may transmit a PDCCH for the same DCI (carrying the same DCI) in a first monitoring occasion or a second monitoring occasion.

On the other hand, if multiple TRPs correspond to one base station (e.g., multiple TRPs correspond to different cells in a base station, respectively), a PDCCH is transmitted from different TRPs as described in the above-described methods (e.g., Embodiments 1 to 11, etc.), but may be transmitted from one base station. That is, one base station may transmit a PDCCH for the same DCI (carrying the same DCI) in a first monitoring occasion and a second monitoring occasion.

A PDCCH for the same DCI may be transmitted from multiple TRPs. Here, the same DCI may mean a DCI format including the same information. And, different search space sets may correspond to each TRP, a PDCCH for the same DCI (carrying the same DCI) may be repeatedly transmitted at a plurality of monitoring occasions (or search spaces) of different search space sets.

Here, different search space sets used for the repetition (or division) of the PDCCH may be associated with different CORESETs, respectively, and different QCL information for receiving the PDCCH may be configured for each CORESET. Alternatively, different search space sets used for the repetition (or division) of the PDCCH may be associated with the same single CORESET. In this case, in the single CORESET, QCL information may be configured as much as the number of search space sets associated for the PDCCH reception, or one QCL information may be configured irrespective of the number of search space sets (that is, STRP transmission).

Here, according to the above-described methods (e.g., Embodiments 1 to 11, etc.), a pair between a plurality of monitoring occasions (or search spaces) belonging to a plurality of different search space sets through which repeated (or divided) PDCCH transmission is transmitted (or monitored) may be determined.

In other words, a PDCCH for the same DCI (carrying the same DCI) in a first monitoring occasion (i.e., search space) of a first search space set and a second monitoring occasion (i.e., search space) of a second search space set may be transmitted to the terminal. Here, according to the above-described methods (e.g., Embodiments 1 to 11, etc.), a pair for the first monitoring occasion and the second monitoring occasion may be determined.

For example, according to the Embodiment 3, the first monitoring occasion and the second monitoring occasion may correspond to the n-th (n is a natural number) monitoring occasion in a predetermined time duration (i.e., window) among one or more monitoring occasions of the first search space set and the second search space set, respectively. Here, for example, according to the Embodiment 4, the first monitoring occasion and the second monitoring occasion may be determined from one or more available monitoring occasions of the first search space set and the second search space set, respectively. Here, a predetermined time duration (i.e., window) may be fixed and predetermined as one slot or half slot. Alternatively, for example, according to the Embodiment 5, a time duration (i.e., window) may be determined based on a monitoring occasion that is the earliest and does not belong to any window among one or more monitoring occasions of the first search space set and the second search space set. Alternatively, for example, according to the Embodiment 6, a time duration (i.e., window) may be determined based on a monitoring occasion that is the earliest and does not belong to any window among one or more monitoring occasions of a specific search space set among the first search space set and the second search space set.

In addition, when a TCI state of a CORESET associated with any one of the first search space set and the second search space set is updated (e.g., update indication by DCI), a linkage between the first search space set and the second search space set may be released. That is, repeated (or divided) transmission of a M-TRP-based PDCCH may be released.

Thereafter, a base station may perform data transmission/reception with a terminal based on transmitted PDCCH (i.e., DCI).

General Device to which the Present Disclosure may be Applied

FIG. 21 illustrates a block diagram of a wireless communication device according to an embodiment of the present disclosure.

In reference to FIG. 21, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device XXX, YYY of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device XXX, YYY of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of receiving a physical downlink control channel (PDCCH) by a terminal in a wireless communication system, the method comprising:
   receiving, from a base station, configuration information related to a first search space set and a second search space set for the PDCCH; and
   receiving, from the base station, the PDCCH for the same downlink control information (DCI) in a first monitoring occasion of the first search space set and a second monitoring occasion of the second search space set,
   wherein the first monitoring occasion and the second monitoring occasion respectively correspond to the n-th monitoring occasion within the first search space set and the second search space set within a single slot, each of the first search space set and the second search space including one or more monitoring occasions, and n being a natural number.

2. The method of claim 1, wherein the first search space set is associated with a first control resource set (CORESET), and the second search space set is associated with a second CORESET, and
   wherein different quasi co-location (QCL) information for receiving the PDCCH is configured for the first CORESET and the second CORESET.

3. The method of claim 1, wherein the first search space set and the second search space set are associated with a single CORESET.

4. The method of claim 1, wherein the configuration information includes information on linkage between the first search space set and the second search space set for transmission of the PDCCH for the same DCI.

5. The method of claim 1, wherein the same number of monitoring occasions of the first search space set and the second search space set exists in the single slot.

6. The method of claim 1, wherein the first monitoring occasion and the second monitoring occasion are determined from one or more monitoring occasions available for transmission of the PDCCH for the same DCI of the first search space set and the second search space set in the single slot.

7. The method of claim 6, wherein the configuration information includes information on one or more monitoring occasions available for transmission of the PDCCH for the same DCI.

8. The method of claim 1, wherein the single slot is determined based on a monitoring occasion that is the earliest of one or more monitoring occasions of the first search space set and the second search space set and that has not been assigned to any existing window.

9. The method of claim 8, wherein the single slot is determined based on a monitoring occasion that is the earliest of one or more monitoring occasions of a specific search space set among the first search space set and the second search space set and that has not been assigned to any existing window.

10. The method of claim 4, wherein, based on an update of a transmission configuration indicator (TCI) state of a CORESET associated with any one of the first search space set and the second search space set, the linkage between the first search space set and the second search space set is released.

11. A terminal configured to receive a physical downlink control channel (PDCCH) in a wireless communication system, the terminal comprising:
   at least one memory storing instructions;
   at least one transceiver configured to transmit and receive a wireless signal; and
   at least one processor for controlling the at least one transceiver and configured to execute the instructions to perform operations comprising:
   receiving, from a base station, configuration information related to a first search space set and a second search space set for the PDCCH; and
   receiving, from the base station, the PDCCH for the same downlink control information (DCI) in a first monitoring occasion of the first search space set and a second monitoring occasion of the second search space set,
   wherein the first monitoring occasion and the second monitoring occasion respectively correspond to the n-th monitoring occasion within the first search space set and the second search space set within a single slot, each of the first search space set and the second search space including one or more monitoring occasions, and n being a natural number.

12. At least one non-transitory computer-readable medium storing at least one instruction, wherein the at least one instruction executable by at least one processor controls a device configured to receive a physical downlink control channel (PDCCH) to:
receive, from a base station, configuration information related to a first search space set and a second search space set for the PDCCH; and
receive, from the base station, the PDCCH for the same downlink control information (DCI) in a first monitoring occasion of the first search space set and a second monitoring occasion of the second search space set,
wherein the first monitoring occasion and the second monitoring occasion respectively correspond to the n-th monitoring occasion within the first search space set and the second search space set in a single slot, each of the first search space set and the second search space including one or more monitoring occasions and n being a natural number.

13. A processing apparatus configured to control a terminal for receiving a physical downlink control channel (PDCCH) in a wireless communication system, the processing apparatus comprising:
at least one processor; and
at least one computer memory operably connected to the at least one processor and storing instructions that, based on being executed by the at least one processor, perform operations comprising:
receiving, from a base station, configuration information related to a first search space set and a second search space set for the PDCCH; and
receiving, from the base station, the PDCCH for the same downlink control information (DCI) in a first monitoring occasion of the first search space set and a second monitoring occasion of the second search space set,
wherein the first monitoring occasion and the second monitoring occasion respectively correspond to the n-th monitoring occasion within the first search space set and the second search space set within a single slot, each of the first search space set and the second search space including one or more monitoring occasions and n being a natural number.

14. A method of transmitting a physical downlink control channel (PDCCH) by a base station in a wireless communication system, the method comprising:
transmitting, to a terminal, configuration information related to a first search space set and a second search space set for the PDCCH; and
transmitting, to the terminal, the PDCCH for the same downlink control information (DCI) in a first monitoring occasion of the first search space set and a second monitoring occasion of the second search space set,
wherein the first monitoring occasion and the second monitoring occasion respectively correspond to the n-th monitoring occasion within the first search space set and the second search space set within a single slot, each of the first search space set and the second search space including one or more monitoring occasions and n being a natural number.

15. A base station configured to transmit a physical downlink control channel (PDCCH) in a wireless communication system, the base station comprising:
at least one memory storing instructions;
at least one transceiver for transmitting and receiving a wireless signal; and
at least one processor for controlling the at least one transceiver and configured to execute the instructions to perform operations comprising:
transmitting, to a terminal, configuration information related to a first search space set and a second search space set for the PDCCH; and
transmitting, to the terminal, the PDCCH for the same downlink control information (DCI) in a first monitoring occasion of the first search space set and a second monitoring occasion of the second search space set,
wherein the first monitoring occasion and the second monitoring occasion respectively correspond to the n-th monitoring occasion within the first search space set and the second search space set within a single slot, each of the first search space set and the second search space including one or more monitoring occasions and n being a natural number.

* * * * *

UNITED STATES PATENT AND TRADEMARK OFFICE
CERTIFICATE OF CORRECTION

PATENT NO. : 12,082,016 B2
APPLICATION NO. : 17/556244
DATED : September 3, 2024
INVENTOR(S) : Hyungtae Kim and Jiwon Kang Page 1 of 1

It is certified that error appears in the above-identified patent and that said Letters Patent is hereby corrected as shown below:

In the Claims

Column 48, Line 2; In Claim 1, after "second search space" insert -- "set" -- therefor.

Column 49, Line 2; In Claim 11, after "second search space" insert -- "set" -- therefor.

Column 49, Line 21; In Claim 12, after "second search space" insert -- "set" -- therefor.

Column 50, Line 2; In Claim 13, after "second search space" insert -- "set" -- therefor.

Column 50, Line 18; In Claim 14, after "second search space" insert -- "set" -- therefor.

Column 50, Line 41; In Claim 15, after "second search space" insert -- "set" -- therefor.

Signed and Sealed this
Eighth Day of July, 2025

Coke Morgan Stewart
*Acting Director of the United States Patent and Trademark Office*